United States Patent
Lynch et al.

(10) Patent No.: US 7,468,241 B1
(45) Date of Patent: Dec. 23, 2008

(54) PROCESSING LATITUDE STABILIZERS FOR PHOTOTHERMOGRAPHIC MATERIALS

(75) Inventors: Doreen C. Lynch, Afton, MN (US); William D. Ramsden, Afton, MN (US); Sharon M. Simpson, Lake Elmo, MN (US); Chaofeng Zou, Maplewood, MN (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 11/858,984

(22) Filed: Sep. 21, 2007

(51) Int. Cl.
*G03C 5/16* (2006.01)
*G03C 1/00* (2006.01)

(52) U.S. Cl. .............. 430/348; 430/349; 430/350; 430/617; 430/618; 430/619; 430/620

(58) Field of Classification Search ......... 430/617–620, 430/348–350
See application file for complete search history.

(56) References Cited

U.S. PATENT DOCUMENTS

| | | |
|---|---|---|
| 1,623,499 A | 5/1927 | Sheppard et al. |
| 2,399,083 A | 4/1946 | Waller et al. |
| 2,489,341 A | 11/1949 | Waller et al. |
| 2,565,418 A | 8/1951 | Yackel |
| 2,614,928 A | 10/1952 | Yutzy et al. |
| 2,618,556 A | 11/1952 | Hewitson et al. |
| 3,074,809 A | 1/1963 | Owen |
| 3,080,254 A | 3/1963 | Grant, Jr. |
| 3,094,417 A | 6/1963 | Workman |
| 3,121,060 A | 2/1964 | Duane |
| 3,206,312 A | 9/1965 | Sterman et al. |
| 3,220,839 A | 11/1965 | Herz et al. |
| 3,235,652 A | 2/1966 | Lindsey |
| 3,241,969 A | 3/1966 | Hart et al. |
| 3,287,135 A | 11/1966 | Anderson et al. |
| 3,297,446 A | 1/1967 | Dunn |
| 3,297,447 A | 1/1967 | McVeigh |
| 3,330,663 A | 7/1967 | Weyde et al. |
| 3,428,451 A | 2/1969 | Trevoy |
| 3,438,776 A | 4/1969 | Yudelson |
| 3,446,648 A | 5/1969 | Workman |
| 3,457,075 A | 7/1969 | Morgan et al. |
| 3,700,458 A | 10/1972 | Lindholm |
| 3,719,495 A | 3/1973 | Lea |
| 3,785,830 A | 1/1974 | Sullivan et al. |
| 3,832,186 A | 8/1974 | Masuda et al. |
| 3,839,049 A | 10/1974 | Simons |
| 3,844,797 A | 10/1974 | Willems et al. |
| 3,847,612 A | 11/1974 | Winslow |
| 3,874,946 A | 4/1975 | Costa et al. |
| 3,951,660 A | 4/1976 | Hagemann |
| 3,985,565 A | 10/1976 | Gabrielson et al. |
| 4,001,024 A | 1/1977 | Dittman et al. |
| 4,030,931 A | 6/1977 | Nogucki et al. |
| 4,082,901 A | 4/1978 | Laridon et al. |
| 4,123,274 A | 10/1978 | Knight et al. |
| 4,123,282 A | 10/1978 | Winslow |
| 4,196,002 A | 4/1980 | Levinson et al. |
| 4,220,709 A | 9/1980 | deMauriac |
| 4,260,677 A | 4/1981 | Winslow et al. |
| 4,302,523 A | 11/1981 | Audran et al. |
| 4,396,712 A | 8/1983 | Kinoshita et al. |
| 4,439,520 A | 3/1984 | Kofron et al. |
| 4,504,575 A | 3/1985 | Lee |
| 4,524,128 A | 6/1985 | Edwards et al. |
| 4,569,863 A | 2/1986 | Koepke et al. |
| 4,581,329 A | 4/1986 | Sugimoto et al. |
| 4,582,786 A | 4/1986 | Ikeda et al. |
| 4,609,621 A | 9/1986 | Sugimoto et al. |
| 4,670,373 A | 6/1987 | Kitaguchi et al. |
| 4,675,279 A | 6/1987 | Shuto et al. |
| 4,678,741 A | 7/1987 | Yamada et al. |
| 4,690,883 A | 9/1987 | Kubodera et al. |
| 4,720,451 A | 1/1988 | Shuto et al. |
| 4,741,992 A | 5/1988 | Przezdziecki |
| 4,761,361 A | 8/1988 | Ozaki et al. |
| 4,775,613 A | 10/1988 | Hirai et al. |
| 4,784,939 A | 11/1988 | Van Pham |
| 4,818,675 A | 4/1989 | Miyasaka et al. |
| 4,840,882 A | 6/1989 | Iwagaki et al. |
| 4,873,184 A | 10/1989 | Simpson |
| 4,945,036 A | 7/1990 | Arai et al. |
| 4,952,491 A | 8/1990 | Nishikawa et al. |
| 5,028,523 A | 7/1991 | Skoug |
| 5,049,485 A | 9/1991 | Deaton |
| 5,064,753 A | 11/1991 | Sohei et al. |
| 5,135,842 A | 8/1992 | Kitchin et al. |

(Continued)

FOREIGN PATENT DOCUMENTS

| | | |
|---|---|---|
| EP | 0 227 141 | 11/1986 |
| EP | 0 342 810 | 11/1989 |
| EP | 0 559 228 | 3/1993 |
| EP | 0 600 586 | 9/1993 |
| EP | 0 600 587 | 9/1993 |
| EP | 0 640 589 | 8/1994 |
| EP | 0 678 776 | 10/1995 |
| EP | 0 821 271 | 6/1997 |
| EP | 0 915 371 | 10/1998 |
| EP | 1 083 459 | 3/2001 |

(Continued)

OTHER PUBLICATIONS

Lynch et al., "Photothermographic Reducing Agents With Bicyclic or Tricyclic Substitution", U.S. Appl. No. 11/351,593, filed Feb. 10, 2006, now Patent No. 7,241,561 issued Jul. 10, 2007.

(Continued)

*Primary Examiner*—Geraldina Visconti

(57) ABSTRACT

Use of certain compounds in black-and-white photothermographic materials improves processing latitude particularly under conditions of high humidity.

20 Claims, No Drawings

U.S. PATENT DOCUMENTS

| | | |
|---|---|---|
| 5,149,620 A | 9/1992 | Simpson et al. |
| 5,158,866 A | 10/1992 | Simpson et al. |
| 5,175,081 A | 12/1992 | Krepski et al. |
| 5,250,386 A | 10/1993 | Aono et al. |
| 5,252,455 A | 10/1993 | Deaton |
| 5,266,452 A | 11/1993 | Kitchin et al. |
| 5,281,515 A | 1/1994 | Delprato et al. |
| 5,298,390 A | 3/1994 | Sakizadeh et al. |
| 5,300,420 A | 4/1994 | Kenney et al. |
| 5,310,640 A | 5/1994 | Markin et al. |
| 5,314,795 A | 5/1994 | Helland et al. |
| 5,358,843 A | 10/1994 | Sakizadeh et al. |
| 5,368,979 A | 11/1994 | Freedman et al. |
| 5,368,995 A | 11/1994 | Christian et al. |
| 5,369,000 A | 11/1994 | Sakizadeh et al. |
| 5,380,635 A | 1/1995 | Gomez et al. |
| 5,382,504 A | 1/1995 | Shor et al. |
| 5,391,727 A | 2/1995 | Deaton |
| 5,393,654 A | 2/1995 | Burrows et al. |
| 5,405,740 A | 4/1995 | LaBelle |
| 5,415,993 A | 5/1995 | Hanzalik et al. |
| 5,434,043 A | 7/1995 | Zou et al. |
| 5,441,866 A | 8/1995 | Miller et al. |
| 5,460,938 A | 10/1995 | Kirk et al. |
| 5,464,747 A | 11/1995 | Eisenbeis et al. |
| 5,468,603 A | 11/1995 | Kub |
| 5,491,059 A | 2/1996 | Whitcomb |
| 5,493,327 A | 2/1996 | McCallum et al. |
| 5,508,162 A | 4/1996 | Dankosh |
| 5,510,236 A | 4/1996 | Dankosh |
| 5,525,376 A | 6/1996 | Leonard |
| 5,532,121 A | 7/1996 | Yonkoski et al. |
| 5,541,054 A | 7/1996 | Miller et al. |
| 5,545,505 A | 8/1996 | Simpson |
| 5,545,507 A | 8/1996 | Simpson et al. |
| 5,545,515 A | 8/1996 | Murray et al. |
| 5,558,983 A | 9/1996 | Simpson et al. |
| 5,599,647 A | 2/1997 | Defieuw et al. |
| 5,620,840 A | 4/1997 | Maskasky |
| 5,621,983 A | 4/1997 | Lundemann et al. |
| 5,635,339 A | 6/1997 | Murray |
| 5,637,449 A | 6/1997 | Harring et al. |
| 5,652,091 A | 7/1997 | Perry et al. |
| 5,654,130 A | 8/1997 | Murray |
| 5,667,955 A | 9/1997 | Maskasky |
| 5,672,562 A | 9/1997 | Goswami et al. |
| 5,686,228 A | 11/1997 | Murray et al. |
| 5,691,127 A | 11/1997 | Daubendiek et al. |
| 5,705,324 A | 1/1998 | Murray |
| 5,716,772 A | 2/1998 | Taguchi |
| 5,733,608 A | 3/1998 | Kessel et al. |
| 5,759,761 A | 6/1998 | Lushington et al. |
| 5,780,207 A | 7/1998 | Mohapatra et al. |
| 5,795,708 A | 8/1998 | Boutet |
| 5,804,365 A | 9/1998 | Bauer et al. |
| 5,843,530 A | 12/1998 | Jerry et al. |
| 5,849,363 A | 12/1998 | Yapel et al. |
| 5,861,195 A | 1/1999 | Bhave et al. |
| 5,891,610 A | 4/1999 | Bauer et al. |
| 5,891,615 A | 4/1999 | Winslow et al. |
| 5,912,111 A | 6/1999 | Lok et al. |
| 5,928,857 A | 7/1999 | Geisler et al. |
| 5,939,249 A | 8/1999 | Zou |
| 5,968,725 A | 10/1999 | Katoh et al. |
| 5,981,151 A | 11/1999 | Leenders et al. |
| 6,013,420 A | 1/2000 | Wingender et al. |
| 6,063,560 A | 5/2000 | Suzuki et al. |
| 6,083,681 A | 7/2000 | Lynch et al. |
| 6,090,538 A | 7/2000 | Arai et al. |
| 6,100,022 A | 8/2000 | Inoue et al. |
| 6,143,487 A | 11/2000 | Philip et al. |
| 6,146,822 A | 11/2000 | Asanuma et al. |
| 6,150,084 A | 11/2000 | Ito et al. |
| 6,165,704 A | 12/2000 | Miyake et al. |
| 6,171,767 B1 | 1/2001 | Kong et al. |
| 6,190,822 B1 | 2/2001 | Dickerson et al. |
| 6,203,972 B1 | 3/2001 | Katoh et al. |
| 6,306,566 B2 | 10/2001 | Sakurada et al. |
| 6,352,819 B1 | 3/2002 | Kenney et al. |
| 6,355,405 B1 | 3/2002 | Ludemann et al. |
| 6,355,408 B1 | 3/2002 | Whitcomb et al. |
| 6,368,779 B1 | 4/2002 | Lynch et al. |
| 6,387,605 B1 | 5/2002 | Lynch et al. |
| 6,413,710 B1 | 7/2002 | Shor et al. |
| 6,413,712 B1 | 7/2002 | Yoshioka et al. |
| 6,420,102 B1 | 7/2002 | Bauer et al. |
| 6,423,481 B1 | 7/2002 | Simpson et al. |
| 6,436,616 B1 | 8/2002 | Geisler et al. |
| 6,440,649 B1 | 8/2002 | Simpson et al. |
| 6,455,210 B1 | 9/2002 | Irving et al. |
| 6,465,162 B1 | 10/2002 | Kong et al. |
| 6,472,131 B1 | 10/2002 | Whitcomb |
| 6,475,710 B2 | 11/2002 | Kudo et al. |
| 6,485,898 B2 | 11/2002 | Yoshioka et al. |
| 6,514,677 B1 | 2/2003 | Ramsden et al. |
| 6,514,684 B2 | 2/2003 | Suzuki et al. |
| 6,558,880 B1 | 5/2003 | Goswami et al. |
| 6,566,042 B1 | 5/2003 | Goto et al. |
| 6,573,033 B1 | 6/2003 | Simpson et al. |
| 6,599,685 B1 | 7/2003 | Kong |
| 6,620,577 B1 | 9/2003 | Lynch et al. |
| 6,620,582 B2 | 9/2003 | Hirabayashi |
| 6,630,283 B1 | 10/2003 | Simpson et al. |
| 6,645,714 B2 | 11/2003 | Oya et al. |
| 6,667,148 B1 | 12/2003 | Rao et al. |
| 6,689,546 B1 | 2/2004 | LaBelle et al. |
| 6,689,547 B2 | 2/2004 | Hunt et al. |
| 6,699,647 B2 | 3/2004 | Lynch et al. |
| 6,699,648 B2 | 3/2004 | Sakizadeh et al. |
| 6,699,649 B2 | 3/2004 | Nishijima et al. |
| 6,713,240 B2 | 3/2004 | Lynch et al. |
| 6,746,831 B1 | 6/2004 | Hunt |
| 6,762,013 B2 | 7/2004 | Sakizadeh et al. |
| 6,764,385 B2 | 7/2004 | Boumerzoug et al. |
| 6,787,298 B2 | 9/2004 | Goto et al. |
| 6,803,177 B2 | 10/2004 | Bokhonov et al. |
| 6,841,343 B2 | 1/2005 | Lynch et al. |
| 6,942,960 B2 | 9/2005 | Maskasky et al. |
| 6,977,139 B2 | 12/2005 | Hasberg et al. |
| 7,008,748 B1 | 3/2006 | Hasberg et al. |
| 7,018,787 B1 | 3/2006 | Ludemann et al. |
| 7,022,467 B1 | 4/2006 | Ludemann et al. |
| 7,026,105 B2 | 4/2006 | Simpson et al. |
| 7,063,941 B2 | 6/2006 | Burleva et al. |
| 7,169,543 B2 | 1/2007 | Ramsden et al. |
| 7,169,544 B2 | 1/2007 | Chen-Ho et al. |
| 7,192,695 B2 | 3/2007 | Sakai et al. |
| 2004/0053173 A1 | 3/2004 | Maskasky et al. |
| 2004/0234906 A1 | 11/2004 | Ohzeki et al. |
| 2005/0048422 A1 | 3/2005 | Nakagawa |
| 2005/0118542 A1 | 6/2005 | Mori et al. |
| 2005/0123871 A1 | 6/2005 | Burleva et al. |
| 2005/0214702 A1 | 9/2005 | Tomoyuki |
| 2005/0221237 A1 | 10/2005 | Saki et al. |
| 2005/0233269 A1 | 10/2005 | Simpson et al. |
| 2006/0014111 A1 | 1/2006 | Goto |
| 2006/0046215 A1 | 3/2006 | Ludemann et al. |
| 2006/0046932 A1 | 3/2006 | Ludemann et al. |
| 2006/0093973 A1 | 5/2006 | Ludemann et al. |
| 2006/0141404 A1 | 6/2006 | Philip, Jr. et al. |
| 2007/0117053 A1 | 5/2007 | Hunt et al. |
| 2008/0145788 A1* | 6/2008 | Simpson et al. .......... 430/288.1 |

| | | |
|---|---|---|
| 2008/0145800 A1* | 6/2008 | Zou et al. .................. 430/330 |

FOREIGN PATENT DOCUMENTS

| | | |
|---|---|---|
| GB | 623448 | 7/1946 |
| GB | 837 095 | 6/1960 |
| GB | 955061 | 6/1962 |
| GB | 1 439 478 | 12/1973 |
| GB | 1 565 043 | 3/1978 |
| JP | 49-13224 | 2/1974 |
| JP | 50-17216 | 2/1975 |
| JP | 51-42529 | 4/1976 |
| JP | 11-302550 | 11/1999 |
| JP | 2000-029168 | 1/2000 |
| JP | 2000-63690 | 2/2000 |
| JP | 2000-112054 | 4/2000 |
| JP | 2000-273329 | 10/2000 |
| JP | 2001-5145 | 1/2001 |
| JP | 2001-51371 | 2/2001 |
| JP | 2001-64527 | 3/2001 |
| JP | 2001-109101 | 4/2001 |
| JP | 2001-142175 | 5/2001 |
| JP | 2001-154305 | 6/2001 |
| JP | 2001-183770 | 7/2001 |
| JP | 2003-114497 | 4/2003 |
| JP | 2003-121964 | 4/2003 |
| JP | 2005-208416 | 8/2005 |
| JP | 2005-338660 | 12/2005 |

OTHER PUBLICATIONS

Ulrich et al., "Thermally Developable Materials Containing Reducing Agent Combinations", U.S. Appl. No. 11/507,550, filed Aug. 21, 2006.

Simpson et al., "Thermally Developable Materials Stabilized With Crown Ethers", U.S. Appl. No. 11/455,415, filed Jun. 19, 2006, now Patent No. 7,267,936 issued Sep. 11, 2007.

Simpson et al., "Photothermographic Materials Containing Co-Developer With Phosphonium Cation", U.S. Appl. No. 11/611,914, filed Dec. 2006.

Chen-Ho et al., "Photothermographic Materials Incorporating Arylboronic Acids", U.S. Appl. No. 11/351,773, filed Feb. 10, 2006, now Patent No. 7,255,982 issued Aug. 14, 2007.

Sakizadeh et al., "Photothermographic Materials Containing Print Stabilizers", U.S. Appl. No. 11/550,461, filed Oct. 18, 2006, now Patent No. 7,258,967 issued Aug. 21, 2007.

Zou et al., Photothermographic Materials Containing Developer and Co-Developer, U.S. Appl. No. 11/611,913, filed Dec. 18, 2006.

Zou et al., Photothermographic Matrials Containing Developer and Co-Developer, U.S. Appl. No. 11/735,530, filed Apr. 16, 2007.

Brinckman et al., Unconventional Imaging Processes, The Focal Press, London and New York , 1978, pp. 74-74.

D. H. Klosterboer, Thermally Processed Silver Systems, Van Nostrand-Reinhold, New York, 1989, Chapter 9, pp. 279-291.

Zou et al., Mechanisms of Latent Image Formation in Photothermographic Silver Imaging Media, Journal of Imaging Science and Technology, vol. 40, No. 2, pp. 94-103, Mar./Apr. 1996.

M. R. V. Sahyun, Thermally Developable Photographic Materials (TDPM): A Review of the State-of-the Art in Mechanistic Understanding, Journal of Imaging Science and Technology, vol. 42, No. 1, pp. 23-30, Jan./Feb. 1998.

T.H. James, "The Theory of the Photographic Process," Fourth Edition, Eastman Kodak, Rochester, NY, 1977, p. 374.

T.H. James, "The Theory of the Photographic Process," Fourth Edition, Eastman Kodak, Rochester, NY, 1977, Chapter 5, pp. 149-169.

T.H. James, "The Theory of the Photographic Process," Fourth Edition, Eastman Kodak, Rochester, NY, 1977, Chapter 2, pp. 77-78.

T.H. James, "The Theory of the Photographic Process," Third Edition, Macmillan, NY, 1966, Chapter 2.

Y. Yoshioka et al., "Development of Rapid Dry Photothermographic Materials with Water-Base Emulsion Coating Method," AgX 2004: The Intenational Symposium on Silver Halide Technology "At the Forefront of Silver Halide Imaging", Final Program and Proceedings of IS&T and SPSTJ, Ventura, CA, Sep. 13-15, 2004, pp. 28-31.

Lange's Handbook of Chemistry, 14th Edition., McGraw-Hill 1992, Chapter 9, pp. 2-7.

R. A. Elder, "Resistivity Measurements on Buried Conductive Layers," EOS/ESD Symposium Proceedings, Lake Buena Vista, FL, 1990, pp. 251-254.

Particle Size Analysis, ASTM Symposium on Light Microscopy, R. P. Loveland, 1955, pp. 94-122.

Research Disclosure 17029.
Research Disclosure 308119.
Research Disclosure 36544.
Research Disclosure 22812.
Research Disclosure 23419.
Research Disclosure 38957.
Research Disclosure 34390.

* cited by examiner

PROCESSING LATITUDE STABILIZERS FOR PHOTOTHERMOGRAPHIC MATERIALS

FIELD OF THE INVENTION

This invention relates to black-and-white photothermographic materials having certain compounds that provide improved processing latitude particularly under conditions of high humidity. This invention also relates to methods of imaging and using these materials.

BACKGROUND OF THE INVENTION

Silver-containing photothermographic imaging materials (that is, photosensitive thermally developable imaging materials) that are imaged with actinic radiation and then developed using heat and without liquid processing, have also been known in the art for many years. Such materials are used in a recording process wherein an image is formed by imagewise exposure of the photothermographic material to specific electromagnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (acting as a developer) for the reducible silver ions, and (d) a binder. The latent image is then developed by application of thermal energy.

In photothermographic materials, exposure of the photosensitive silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black-and-white image. The non-photosensitive silver source is catalytically reduced to form the visible black-and-white negative image of silver while much of the silver halide, generally, remains as silver halide and is not reduced.

In photothermographic materials, a typical non-photosensitive reducible silver source is a silver salt of a long chain aliphatic carboxylic acid having from 10 to 30 carbon atoms, such as behenic acid or mixtures of acids of similar molecular weight. At elevated temperatures, the silver of the silver carboxylate is reduced by a reducing agent for silver ion (also known as a developer), whereby elemental silver is formed. The reducing agent for the reducible silver ions, often referred to as a "developer", may be any compound that, in the presence of the latent image, can reduce silver ion to metallic silver and is usually of relatively low activity until it is heated to a temperature sufficient to cause the reaction. A wide variety of classes of compounds have been disclosed in the literature that function as reducing agents for photothermographic materials. Upon heating, and at elevated temperatures, the reducible silver ions are reduced by the reducing agent. This reaction occurs preferentially in the regions surrounding the latent image and produces a negative image of metallic silver having a color that ranges from yellow to deep black depending upon the presence of toning agents and other components in the photothermographic imaging layer(s).

Differences Between Photothermography and Photography:

The imaging arts have long recognized that the field of photothermography is clearly distinct from that of photography. Photothermographic materials differ significantly from conventional silver halide photographic materials that require processing with aqueous processing solutions.

In photothermographic imaging materials, a visible image is created in the absence of a processing solvent by heat as a result of the reaction of a reducing agent incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example, a silver carboxylate or a silver benzotriazole) is used to generate the visible image using thermal development. Thus, the imaged photosensitive silver halide serves is a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a reducing agent (that is, a developer for the reducible silver ions) while conventional photographic materials usually do not. The incorporation of the reducing agent into photothermographic materials can lead to increased formation of various types of "fog" or other undesirable sensitometric side effects. Therefore, much effort has gone into the preparation and manufacture of photothermographic materials to minimize these problems.

Moreover, in photothermographic materials, the unexposed silver halide generally remains intact after development and the material must be stabilized against further imaging and development. In contrast, silver halide is removed from conventional photographic materials after solution development to prevent further imaging (that is in the aqueous fixing step).

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the underlying chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic material, to be inactive in photothermographic materials.

These and other distinctions between photothermographic and photographic materials are described in *Unconventional Imaging Processes*, E. Brinckman et al. (Eds.), The Focal Press, London and New York, 1978, pp. 74-75, in D. H. Klosterboer, *Imaging Processes and Materials*, (*Neblette's Eighth Edition*), J. Sturge, V. Walworth, and A. Shepp, Eds., Van Nostrand-Reinhold, New York, 1989, Chapter 9, pp. 279-291, in C. Zou et al., *J. Imaging Sci. Technol.* 1996, 40, pp. 94-103, and in M. R. V. Sahyun, *J. Imaging Sci. Technol.* 1998, 42, 23.

PROBLEM TO BE SOLVED

Recently, there has been a desire to provide photothermographic materials with lower amounts of silver, yet still have the same sensitometric properties. U.S. Patent Application Publications 2008/0145801 (Zou et al.) and 2008/0145800 (Zou et al.) both describe the use of substituted olefinic co-developers to achieve this result.

Because photothermographic materials are developed with heat, their sensitometric properties are particularly sensitive to changes in development time, temperature and humidity. A large amount of work has gone into the design and development of thermal processors to maintain the development time and temperature of photothermographic materials within narrow limits. Nevertheless, changes in development time and temperature can occur as the processor ages or can even be caused by variability among machines. This can result in changes in sensitometric properties such as density, contrast, and photospeed.

Processing latitude is the sensitivity of a photothermographic material to changes in development time, temperature, and humidity. It is desirable to design photothermographic materials with wide processing latitude.

There has also been a desire to use photothermographic materials in locations where the climate is more humid and cannot be controlled. These improvements are desirable as they decrease the need to strictly control the environment of the photothermographic material before and during thermal processing and reduce the need to strictly control the time and temperature of the thermal processor. Unfortunately, decreased silver coating weights and high humidity can adversely affect processing latitude.

Thus a need exists for photothermographic materials with improved processing latitude, particularly under high humidity conditions.

SUMMARY OF THE INVENTION

To address this need, this invention provides a black-and-white photothermographic material comprising a support having on at least one side thereof, one or more photothermographic emulsion layers comprising in reactive association:

a. a photosensitive silver halide, b. a non-photosensitive source of reducible silver ions, c. a reducing agent composition for the reducible silver ions, d. a polymeric binder, e. one or more processing latitude stabilizers represented by Structures (I) or (II),

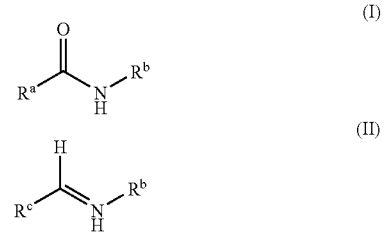

wherein $R^a$ represents a substituted or unsubstituted alkyl, cycloalkyl, alkenyl, cycloalkenyl, heterocyclic, aromatic, or heteroaromatic group, wherein $R^b$ represents an aromatic carboxylate group whose corresponding acid has a pKa less than about 3, and wherein $R^c$ represents a substituted or unsubstituted alkyl, cycloalkyl, alkenyl, cycloalkenyl, heterocyclic, aromatic, or heteroaromatic group, and f. a substituted olefinic co-developer.

This invention further provides a black-and-white photothermographic material comprising a support having on at least one side thereof, one or more photothermographic emulsion layers comprising in reactive association:

a. a photosensitive silver halide that is silver bromide or silver iodobromide that is present predominantly in cubic or tabular grains, b. a non-photosensitive source of reducible silver ions comprising at least silver behenate, c. a reducing agent is one or more of tris-phenol reducing agents represented by Structures (TP-1) or (TP-2) that is present in an amount of from about 1 to about 5 mmol/m$^2$,

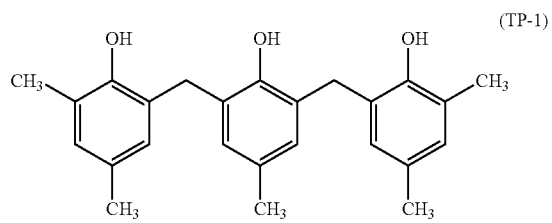

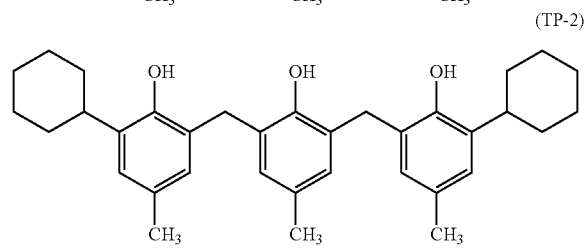

d. a polymeric binder is a polyvinyl butyral or polyvinyl acetal, and e. one or more processing latitude stabilizers represented by Structures (I) or (II),

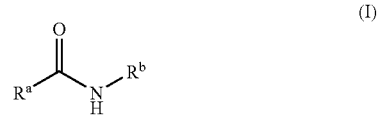

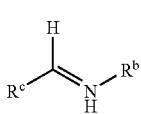

wherein $R^a$ represents a substituted or unsubstituted alkyl or cycloalkyl group of 1 to 10 carbon atoms, or a substituted or unsubstituted phenyl or naphthyl group, $R^b$ represents a 2,4-dichlorophenylcarboxyl, 1,3,5-trichlorophenyl-carboxyl, or 2-chloro-4-nitrophenylcarboxyl group, $R^c$ represents an alkoxy substituted phenyl or naphthyl group wherein the alkoxy group has 1 to 6 carbon atoms, and f. a substituted olefinic co-developer represented by the following Structure (IV):

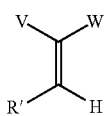

wherein V and W are independently aromatic groups or electron withdrawing groups, provided that at least one of V and W is an electron withdrawing group having a Hammett $\sigma_p$ greater than 0.35, or V and W can represent the atoms necessary to form a ring containing such an electron withdrawing group, and R' is hydroxyl, acyloxy, or, —O⁻A⁺, and wherein the total amount of silver is present in an amount of at least 1 g/m² and less than or equal to 2.6 g/m².

This invention further provides a method of forming a visible image comprising:

(A) imagewise exposing a photothermographic material of this invention to electromagnetic radiation to form a latent image, (B) simultaneously or sequentially, heating the exposed photothermographic material to develop the latent image into a visible image.

We have found that by incorporating specific compounds of type (I) and/or (II), improved processing latitude, particularly under conditions of high humidity, can be achieved with little change in other sensitometric properties.

DETAILED DESCRIPTION OF THE INVENTION

The photothermographic materials of this invention are used to provide black-and-white images using appropriate imaging chemistry and particularly non-photosensitive organic silver salts, photosensitive silver halides, reducing agents, toners, binders, and other components known to a skilled artisan. The reducing agent and substituted olefinic co-developer combinations described herein are present in reactive association with the photosensitive silver halide and non-photosensitive silver salt.

The photothermographic materials can be used in black-and-white photothermography and in electronically generated black-and-white hardcopy recording. They can be used in microfilm applications, in radiographic imaging (for example digital medical imaging), X-ray radiography, and in industrial radiography. Furthermore, the absorbance of these materials between 350 and 450 nm is desirably low (less than 0.5), to permit their use in the graphic arts area (for example, image-setting and phototype-setting), in the manufacture of printing plates, in contact printing, in duplicating ("duping"), and in proofing. Black-and-white imaging is particularly useful.

The photothermographic materials are particularly useful for imaging of human or animal subjects in response to X-radiation, ultraviolet, visible, or infrared radiation for use in a medical diagnosis. Such applications include, but are not limited to, thoracic imaging, mammography, dental imaging, orthopedic imaging, general medical radiography, therapeutic radiography, veterinary radiography, and autoradiography. When used with X-radiation, the photothermographic materials may be used in combination with one or more phosphor intensifying screens, with phosphors incorporated within the photothermographic emulsion, or with combinations thereof. Such materials are also useful for dental radiography when they are directly imaged by X-radiation. The materials are also useful for non-medical uses of X-radiation such as X-ray lithography and industrial radiography.

The photothermographic materials can be made sensitive to radiation of any suitable wavelength. Thus, in some embodiments, the materials are sensitive at ultraviolet, visible, infrared, or near infrared wavelengths, of the electromagnetic spectrum. In some embodiments, the materials are sensitive to radiation greater than 600 nm (for example, sensitive to infrared radiation from about 700 up to about 950 nm). Increased sensitivity to a particular region of the spectrum is imparted through the use of various spectral sensitizing dyes.

In the photothermographic materials, the components needed for imaging can be in one or more photothermographic imaging layers on one side ("frontside") of the support. The layer(s) that contain the photosensitive photocatalyst (such as a photosensitive silver halide) or non-photosensitive source of reducible silver ions, or both, are referred to herein as photothermographic emulsion layer(s). The photocatalyst and the non-photosensitive source of reducible silver ions are in catalytic proximity and generally are in the same emulsion layer.

Where the photothermographic materials contain imaging layers on one side of the support only, various non-imaging layers are usually disposed on the "backside" (non-emulsion or non-imaging side) of the materials, including conductive/antistatic layers, antihalation layers, protective layers, and transport enabling layers.

Various non-imaging layers can also be disposed on the "frontside" or imaging or emulsion side of the support, including protective frontside overcoat layers, primer layers, interlayers, opacifying layers, conductive/antistatic layers, antihalation layers, acutance layers, auxiliary layers, and other layers readily apparent to one skilled in the art.

For some embodiments, it may be useful that the photothermographic materials be "double-sided" or "duplitized" and have the same or different photothermographic coatings (or imaging layers) on both sides of the support. In such constructions each side can also include one or more protective overcoat layers, primer layers, interlayers, acutance layers, conductive/antistatic layers auxiliary layers, anti-crossover layers, and other layers readily apparent to one skilled in the art.

When the photothermographic materials are heat-developed as described below in a substantially water-free condition after, or simultaneously with, imagewise exposure, a silver image (for example, a black-and-white silver image) is obtained.

DEFINITIONS

As used herein:

In the descriptions of the photothermographic materials, "a" or "an" component refers to "at least one" of that component (for example, the processing latitude stabilizers, non-photosensitive source of reducible silver ions, reducing agents, substituted olefinic co-developers, and contrast enhancing agents described herein).

As used herein, "black-and-white" refers to an image formed by silver metal, as opposed to an image formed using a combination of dyes or color couplers.

Unless otherwise indicated, when the term "photothermographic materials" is used herein, the term refers to embodiments of the present invention.

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water or any other solvent for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Photothermograpbic material(s)" means a dry processable integral element comprising a support and at least one photothermographic emulsion layer or a photothermographic set of emulsion layers (wherein the photosensitive silver halide and the source of reducible silver ions are in one layer and the other necessary components or additives are distributed, as desired, in the same layer or in an adjacent coated layer). These materials also include multilayer constructions in which one or more imaging components are in different layers, but are in "reactive association". For example, one layer can include the non-photosensitive source of reducible silver ions and another layer can include the reducing and substituted olefinic co-developer, but the two reactive components are in reactive association with each other. By "integral", we mean that all imaging chemistry required for imaging is in the material without diffusion of imaging chemistry or reaction products (such as a dye) from or to another element (such as a receiver element).

When used in photothermography, the term, "imagewise exposing" or "imagewise exposure" means that the material is imaged as a dry processable material using any exposure means that provides a latent image using electro-magnetic radiation. This includes, for example, by analog exposure where an image is formed by projection onto the photosensitive material as well as by digital exposure where the image is formed one pixel at a time such as by modulation of scanning laser radiation.

The term "emulsion layer", "imaging layer", or "photothermographic emulsion layer" means a layer of a photothermographic material that contains the photosensitive silver halide (when used) and/or non-photosensitive source of reducible silver ions, or a reducing agent composition. Such layers can also contain additional components or desirable additives. These layers are on what is referred to as the "frontside" of the support.

"Photocatalyst" means a photosensitive compound such as silver halide that, upon exposure to radiation, provides a compound that is capable of acting as a catalyst for the subsequent development of the image-forming material.

"Catalytic proximity" or "reactive association" means that the reactive components are in the same layer or in adjacent layers so that they readily come into contact with each other during imaging and thermal development.

The terms "reducing agent" and "developer" mean the same, and the terms "co-reducing agent" and "co-developer" also mean the same.

"Simultaneous coating" or "wet-on-wet" coating means that when multiple layers are coated, subsequent layers are coated onto the initially coated layer before the initially coated layer is dry. Simultaneous coating can be used to apply layers on the frontside, backside, or both sides of the support.

"Transparent" means capable of transmitting visible light or imaging radiation without appreciable scattering or absorption.

The phrases "silver salt" and "organic silver salt" refer to an organic molecule having a bond to a silver atom. Although the compounds so formed are technically silver coordination complexes or silver compounds they are also often referred to as silver salts.

The phrase "aryl group" refers to an organic group derived from an aromatic hydrocarbon by removal of one atom, such as a phenyl group formed by removal of one hydrogen atom from benzene.

"Silver Efficiency" is defined as $D_{max}$ divided by the total silver coating weight in units of g/m2.

The term "buried layer" means that there is at least one other layer disposed over the layer (such as a "buried" backside conductive layer).

The terms "coating weight", "coat weight", and "coverage" are synonymous, and are usually expressed in weight or moles per unit area such as $g/m^2$ or $mol/m^2$.

"Ultraviolet region of the spectrum" refers to that region of the spectrum less than or equal to 400 nm (for example, from about 100 nm to about 400 nm) although parts of these ranges may be visible to the naked human eye.

"Visible region of the spectrum" refers to that region of the spectrum of from about 400 nm to about 700 nm.

"Short wavelength visible region of the spectrum" refers to that region of the spectrum of from about 400 nm to about 450 nm n.

"Red region of the spectrum" refers to that region of the spectrum of from about 600 nm to about 700 nm.

"Infrared region of the spectrum" refers to that region of the spectrum of from about 700 nm to about 1400 mm.

"Non-photosensitive" means not intentionally light sensitive.

The sensitometric terms "photospeed", "speed", or "photographic speed" (also known as sensitivity), absorbance, and contrast have conventional definitions known in the imaging arts. The sensitometric term absorbance is another term for optical density (OD).

Speed-2 is Log 1/E+4 corresponding to the density value of 1.0 above $D_{min}$ where E is the exposure in ergs/cm$^2$.

Average Contrast-1 ("AC-1") is the absolute value of the slope of the line joining the density points at 0.60 and 2.00 above $D_{min}$.

Average Contrast-2 ("AC-2") is the absolute value of the slope of the line joining the density points at 1.00 and 2.40 above $D_{min}$.

Average Contrast-3 ("AC-3") is the absolute value of the slope of the line joining the density points at 2.40 and 2.90 above $D_{min}$.

In photothermographic materials, the term $D_{min}$ (lower case) is considered herein as image density achieved when the photothermographic material is thermally developed without prior exposure to radiation. The term $D_{max}$ (lower case) is the maximum image density achieved in the imaged area of a particular sample after imaging and development.

The term $D_{MIN}$ (upper case) is the density of the nonimaged, undeveloped material. The term $D_{MAX}$ (upper case) is the maximum image density achievable when the photothermographic material is exposed and then thermally developed. $D_{MAX}$ is also known as "Saturation Density".

As is well understood in this art, for the chemical compounds herein described, substitution is not only tolerated, but is often advisable and various substituents are anticipated on the compounds used in the present invention unless otherwise stated. Thus, when a compound is referred to as "having the structure" of a given formula or being a "derivative" of a compound, any substitution that does not alter the bond structure of the formula or the shown atoms within that structure is included within the formula, unless such substitution is specifically excluded by language.

Olefinic compounds (such as the substituted olefinic co-developers) that are described or shown with one particular geometry about the carbon-carbon double bond will be understood to include both "cis" and "trans" isomers about the double bond, including mixtures thereof.

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, ad I), cyano, nitro, amino, and carboxy. For example, alkyl group includes ether and thioether groups (for example $CH_3$—$CH_2$—$CH_2$—O—$CH_2$— and $CH_3$—($H_2$—$CH_2$—S—$CH_2$—), haloalkyl, nitroalkyl, alkylcarboxy, carboxyalkyl, carboxamido, hydroxyalkyl, sulfoalkyl, and other groups readily apparent to one skilled in the art. Substituents that adversely react with other active ingredients, such as very strongly electrophilic or oxidizing substituents, would, of course, be excluded by the skilled artisan as not being inert or harmless.

Research Disclosure (http://www.researchdisclosure.com) is a publication of Kenneth Mason Publications Ltd., The Book Barn, Westbourne, Hampshire PO10 8RS, UK. It is also available from Emsworth Design Inc., 200 Park Avenue South, Room 1101, New York, N.Y. 10003.

Other aspects, advantages, and benefits of the present invention are apparent from the detailed description, examples, and claims provided in this application.

The Photocatalyst:

As noted above, photothermographic materials include one or more photocatalysts in the photothermographic emulsion layer(s). Useful photocatalysts are typically photosensitive silver halides such as silver bromide, silver iodide, silver chloride, silver bromoiodide, silver chlorobromoiodide, silver chlorobromide, and others readily apparent to one skilled in the art. Mixtures of silver halides can also be used in any suitable proportion. Silver bromide and silver iodide are useful. Also useful is silver bromoiodide in which any suitable amount of iodide is present up to almost 100% silver iodide and more likely up to about 40 mol % silver iodide. For example, the silver bromoiodide can comprise at least 70 mole % (for example, at least 85 mole % and or at least 90 mole %) bromide (based on total silver halide). The remainder of the halide is iodide, chloride, or chloride and iodide. In some embodiments, the additional halide is iodide. Silver bromide and silver bromoiodide are useful, with the latter silver halide generally having up to 10 mole % silver iodide.

In some embodiments of aqueous-based photothermographic materials, higher amounts of iodide may be present in homogeneous photosensitive silver halide grains, and particularly from about 20 mol % up to the saturation limit of iodide as described, for example, U.S. Patent Application Publication 2004/0053173 (Maskasky et al.).

The silver halide grains may have any crystalline habit or morphology including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of grains with different morphologies can be employed. Silver halide grains having cubic and tabular morphology (or both) are useful.

The silver halide grains may have a uniform ratio of halide throughout. They may also have a graded halide content, with a continuously varying ratio of, for example, silver bromide and silver iodide or they may be of the core-shell type, having a discrete core of one or more silver halides, and a discrete shell of one or more different silver halides. Core-shell silver halide grains useful in photothermographic materials and methods of preparing these materials are described in U.S. Pat. No. 5,382,504 (Shor et al.). Iridium and/or copper doped core-shell and non-core-shell grains are described in U.S. Pat. Nos. 5,434,043 (Zou et al.) and 5,939,249 (Zou). Bismuth (III)-doped high silver iodide emulsions for aqueous-based photothermographic materials are described in U.S. Pat. No. 6,942,960 (Maskasky et al.).

In some instances, it may be helpful to prepare the photosensitive silver halide grains in the presence of a hydroxytetraazaindene (such as 4-hydroxy-6-methyl-1,3,3a,7-tetraazaindene) or an N-heterocyclic compound comprising at least one mercapto group (such as 1-phenyl-5-mercaptotetrazole) as described in U.S. Pat. No. 6,413,710 (Shor et al.).

The photosensitive silver halide can be added to (or formed within) the emulsion layer(s) in any fashion as long as it is placed in catalytic proximity to the non-photosensitive source of reducible silver ions.

In many embodiments, the silver halides are preformed and prepared by an ex-situ process. With this technique, one has the possibility of more precisely controlling the grain size, grain size distribution, dopant levels, and composition of the silver halide, so that one can impart more specific properties to both the silver halide grains and the resulting photothermographic material.

In some constructions, it is desired to form the non-photosensitive source of reducible silver ions in the presence of ex-situ-prepared silver halide. In this process, the source of reducible silver ions, such as a long chain fatty acid silver carboxylate (commonly referred to as a silver "soap" or homogenate), is formed in the presence of the preformed silver halide grains. Co-precipitation of the source of reducible silver ions in the presence of silver halide provides a more intimate mixture of the two materials to provide a material often referred to as a "preformed soap" [see U.S. Pat. No. 3,839,049 (Simons)].

In other constructions, the preformed silver halide grains may be added to and "physically mixed" with the non-photosensitive source of reducible silver ions.

Preformed silver halide emulsions can be prepared by aqueous or organic processes and can be unwashed or washed to remove soluble salts. Soluble salts can be removed by any desired procedure for example as described in U.S. Pat. Nos. 2,489,341 (Waller et al.), 2,565,418 (Yackel), 2,614,928 (Yutzy et al.), 2,618,556 (Hewitson et al.), and 3,241,969 (Hart et al.).

It is also effective to use an in-situ process in which a halide- or a halogen-containing compound is added to an organic silver salt to partially convert the silver of the organic silver salt to silver halide. Inorganic halides (such as zinc bromide, zinc iodide, calcium bromide, lithium bromide, lithium iodide, or mixtures thereof) or an organic halogen-containing compound (such as N-bromosuccinimide or pyridinium hydrobromide perbromide) can be used. The details of such in-situ generation of silver halide are described in U.S. Pat. No. 3,457,075 (Morgan et al.).

It is particularly effective to use a mixture of both preformed and in-situ generated silver halide. The preformed silver halide is typically present in a preformed soap.

Additional methods of preparing silver halides and organic silver salts and blending them are described in Research Disclosure, June 1978, item 17029, U.S. Pat. Nos. 3,700,458 (Lindholm) and 4,076,539 (Ikenoue et al.), and Japan Kokai 49-013224 (Fuji), 50-017216 (Fuji), and 51-042529 (Fuji).

The silver halide grains used in the imaging formulations can vary in average diameter of up to several micrometers (am) depending on the desired use. For example, silver halide grains for use in preformed emulsions containing silver carboxylates are cubic grains having a number average particle size of from about 0.01 to about 1.0 µm, or typically those having a number average particle size of from about 0.03 to about 0.10 µm. The grains may have a number average particle size of 0.06 µm or less, and typically they have a number average particle size of from about 0.03 to about 0.06 µm. Mixtures of grains of various average particle size can also be used. Silver halide grains for use in high-speed photothermographic constructions are tabular grains having an average thickness of at least 0.02 µm and up to and including 0.10 µm, an equivalent circular diameter of at least 0.5 µm and up to and including 8 µm and an aspect ratio of at least 5:1. Other grains have an average thickness of at least 0.03 µm and up to and including 0.08 µm, an equivalent circular diameter of at least 0.75 µm and up to and including 6 µm and an aspect ratio of at least 10:1.

The average size of the photosensitive silver halide grains is expressed by the average diameter if the grains are spherical, and by the average of the diameters of equivalent circles for the projected images if the grains are cubic or in other non-spherical shapes. Representative grain sizing methods are described in *Particle Size Analysis*, ASTM Symposium on Light Microscopy, R. P. Loveland, 1955, pp. 94-122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

The one or more light-sensitive silver halides are generally present in an amount of from about 0.005 to about 0.5 mole, typically from about 0.01 to about 0.25 mole, or from about 0.03 to about 0.15 mole, per mole of non-photosensitive source of reducible silver ions.

Chemical Sensitization:

The photosensitive silver halides can be chemically sensitized using any useful compound that contains sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149-169. Suitable conventional chemical sensitization procedures are also described in U.S. Pat. Nos. 1,623,499 (Sheppard et al.), 2,399,083 (Waller et al.), 3,297,446 (Dunn), 3,297,447 (McVeigh), 5,049,485 (Deaton), 5,252,455 (Deaton), 5,391,727 (Deaton), 5,759,761 (Lushington et al.), and 5,912,111 (Lok et al.), and EP 0 915 371A1 (Lok et al.).

Mercaptotetrazoles and tetraazindenes as described in U.S. Pat. No. 5,691,127 (Daubendiek et al.) can also be used as suitable addenda for tabular silver halide grains.

Certain substituted and unsubstituted thiourea compounds can be used as chemical sensitizers including those described in U.S. Pat. No. 6,368,779 (Lynch et al.).

Still other additional chemical sensitizers include certain tellurium-containing compounds that are described in U.S. Pat. No. 6,699,647 (Lynch et al.), and certain selenium-containing compounds that are described in U.S. Pat. No. 6,620,577 (Lynch et al.).

Combinations of gold(III)-containing compounds and either sulfur-, tellurium-, or selenium-containing compounds are also useful as chemical sensitizers as described in U.S. Pat. No. 6,423,481 (Simpson et al.).

In addition, sulfur-containing compounds can be decomposed on silver halide grains in an oxidizing environment according to the teaching in U.S. Pat. No. 5,891,615 (Winslow et al.). Examples of sulfur-containing compounds that can be used in this fashion include sulfur-containing spectral sensitizing dyes. Other useful sulfur-containing chemical sensitizing compounds that can be decomposed in an oxidizing environment are the diphenylphosphine sulfide compounds described in U.S. Pat. Nos. 7,026,105 (Simpson et al.), a 7,063,941 (Burleva et al.), and 7,087,366 (Burleva et al.).

The chemical sensitizers can be present in conventional amounts that generally depend upon the average size of the silver halide grains. Generally, the total amount is at least $10^{-10}$ mole per mole of total silver, and typically from about $10^{-8}$ to about $10^{-2}$ mole per mole of total silver for silver halide grains having an average size of from about 0.01 to about 1 µm.

Spectral Sensitization:

The photosensitive silver halides may be spectrally sensitized with one or more spectral sensitizing dyes that are known to enhance silver halide sensitivity to ultraviolet, visible, and/or infrared radiation (that is, sensitivity within the range of from about 300 to about 1400 nm). In some embodiments the photosensitive silver halide is sensitized to infrared radiation (that is from about 700 to about 950 nm). Non-limiting examples of spectral sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. They may be added at any stage in the preparation of the photothermographic emulsion, but are generally added after chemical sensitization is achieved.

Suitable spectral sensitizing dyes such as those described in U.S. Pat. Nos. 3,719,495 (Lea), 4,396,712 (Kinoshita et al.), 4,439,520 (Kofron et al.), 4,690,883 (Kubodera et al.), 4,840,882 (Iwagaki et al.), 5,064,753 (Kohno et al.), 5,281,515 (Delprato et al.), 5,393,654 (Burrows et al.), 5,441,866 (Miller et al.), 5,508,162 (Dankosh), 5,510,236 (Dankosh), and 5,541,054 (Miller et al.), Japan Kokai 2000-063690 (Tanaka et al.), 2000-112054 (Fukusaka et al.), 2000-273329 (Tanaka et al.), 2001-005145 (Arai), 2001-064527 (Oshiyama et al.), and 2001-154305 (Kita et al.) can be used. Useful spectral sensitizing dyes are also described in

*Research Disclosure*, December 1989, item 308119, Section IV and *Research Disclosure*, 1994, item 36544, section V.

Teachings relating to specific combinations of spectral sensitizing dyes also include U.S. Pat. Nos. 4,581,329 (Sugimoto et al.), 4,582,786 (Ikeda et al.), 4,609,621 (Sugimoto et al.), 4,675,279 (Shuto et al.), 4,678,741 (Yamada et al.), 4,720,451 (Shuto et al.), 4,818,675 (Miyasaka et al.), 4,945,036 (Arai et al.), and 4,952,491 (Nishikawa et al.).

Also useful are spectral sensitizing dyes that decolorize by the action of light or heat as described in U.S. Pat. No. 4,524,128 (Edwards et al.) and Japan Kokai 2001-109101 (Adachi), 2001-154305 (Kita et al.), and 2001-183770 (Hanyu et al.).

Dyes and other compounds may be selected for the purpose of supersensitization to attain much higher sensitivity than the sum of sensitivities that can be achieved by using a sensitizer alone. Examples of such supersensitizers include the metal chelating compounds disclosed in U.S. Pat. No. 4,873,184 (Simpson), the large cyclic compounds featuring a heteroatom disclosed in U.S. Pat. No. 6,475,710 (Kudo et al.), the stilbene compounds disclosed in EP 0 821 271 (Uytterhoeven et al.).

An appropriate amount of spectral sensitizing dye added is generally about $10^{-10}$ to $10^{-1}$ mole, and typically, about $10^{-7}$ to $10^{-2}$ mole per mole of silver halide.

Non-Photosensitive Source of Reducible Silver Ions:

The non-photosensitive source of reducible silver ions in the thermally developable materials is a silver-organic compound that contains reducible silver(I) ions. Such compounds are generally silver salts of silver organic coordinating ligands that are comparatively stable to light and form a silver image when heated to 50° C. or higher in the presence of an exposed photocatalyst (such as silver halide) and a reducing agent composition.

The primary organic silver salt is often a silver salt of an aliphatic carboxylic acid (described below). Mixtures of silver salts of aliphatic carboxylic acids are particularly useful where the mixture includes at least silver behenate. The carboxylic acids from which these silver salts are prepared are also often referred to as "fatty carboxylic acids" or "long chain fatty carboxylic acids", or long chain carboxylates.

Useful silver carboxylates include silver salts of long-chain aliphatic carboxylic acids. The aliphatic carboxylic acids generally have aliphatic chains that contain 10 to 30, and typically contain 15 to 28, carbon atoms. Examples of such preferred silver salts include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. For example, at least silver behenate is used alone or in mixtures with other silver carboxylates. These silver salts are often referred to as "silver salts of fatty carboxylic acids", "silver salts of long chain carboxylic acids", or more simply as "silver carboxylates". Dispersions of these materials are known as "silver carboxylate soaps" "silver soaps", or "silver soaps of long chain carboxylic acids".

It is also convenient to use silver half soaps such as an equimolar blend of silver carboxylate and carboxylic acid that analyzes for about 14.5% by weight solids of silver in the blend and that is prepared by precipitation from an aqueous solution of an ammonium or an alkali metal salt of a commercially available fatty carboxylic acid, or by addition of the free fatty acid to the silver soap.

Silver salts other than the silver carboxylates described above can be used also. Such silver salts include silver salts of aliphatic carboxylic acids containing a thioether group as described in U.S. Pat. No. 3,330,663 (Weyde et al.), soluble silver carboxylates comprising hydrocarbon chains incorporating ether or thioether linkages or sterically hindered substitution in the α-(on a hydrocarbon group) or ortho-(on an phenyl group) position as described in U.S. Pat. No. 5,491,059 (Whitcomb), silver salts, of dicarboxylic acids, silver salts of sulfonates as described in U.S. Pat. No. 4,504,575 (Lee), silver salts of sulfosuccinates as described in EP 0 227 141A1 (Leenders et al.), silver salts of aryl carboxylic acids (such as silver benzoate), silver salts of acetylenes as described, for example in U.S. Pat. Nos. 4,761,361 (Ozaki et al.) and 4,775,613 (Hirai et al.), and silver salts of heterocyclic compounds containing mercapto or thione groups and derivatives as described in U.S. Pat. Nos. 4,123,274 (Knight et al.) and 3,785,830 (Sullivan et al.).

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielsen et al.) and the references cited above.

Sources of non-photosensitive reducible silver ions can also be core-shell silver salts as described in U.S. Pat. No. 6,355,408 (Whitcomb et al.), silver dimer compounds that comprise two different silver salts as described in U.S. Pat. No. 6,472,131 (Whitcomb), or the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand, as described in U.S. Pat. No. 6,803,177 (Bokhonov et al.).

Organic silver salts that are particularly useful in organic solvent-based thermographic and photothermographic materials include silver carboxylates (both aliphatic and aryl carboxylates), silver benzotriazolates, silver sulfonates, silver sulfosuccinates, and silver acetylides.

Organic silver salts that are useful in aqueous based thermographic and photothermographic materials include silver salts of compounds containing an imino group. Examples of these compounds include, but are not limited to, silver salts of benzotriazole and substituted derivatives thereof (for example, silver methylbenzotriazole and silver 5-chlorobenzotriazole), silver salts of 1,2,4-triazoles or 1-H-tetrazoles such as phenylmercaptotetrazole as described in U.S. Pat. No. 4,220,709 (deMauriac), and silver salts of imidazoles and imidazole derivatives as described in U.S. Pat. No. 4,260,677 (Winslow et al.). Useful silver salts of this type are the silver salts of benzotriazole and substituted derivatives thereof. For example, a silver salt of a benzotriazole is can be used in aqueous-based thermographic and photothermographic formulations.

Useful nitrogen-containing organic silver salts and methods of preparing them are described in U.S. Pat. No. 6,977,139 (Hasberg et al.). Such silver salts (particularly the silver benzotriazoles) are rod-like in shape and have an average aspect ratio of at least 3:1 and a width index for particle diameter of 1.25 or less. Silver salt particle length is generally less than 1 μm. Also useful are silver salt-toner co-precipitated nano-crystals that comprise a silver salt of a nitrogen-containing heterocyclic compound containing an imino group, and a silver salt comprising a silver salt of a mercaptotriazole. Such co-precipitated salts are described in U.S. Pat. No. 7,008,748 (Hasberg et al.).

The one or more non-photosensitive sources of reducible silver ions are generally present in an amount of from about 5% to about 70%, and typically from about 10% to about 50%, based on the total dry weight of the emulsion layers. Alternatively stated, the amount of the sources of reducible silver ions is generally from about 0.002 to about 0.2 mol/m$^2$ of the dry photothermographic material (typically from about 0.01 to about 0.05 mol/m$^2$).

The total amount of silver (from all silver sources) in the photothermographic materials is generally at least 0.002 mol/m$^2$, typically from about 0.01 to about 0.05 mol/m$^2$, or from about 0.01 to about 0.02 mol/m$^2$. In other aspects, it is desirable to use total silver [from both silver halide (when present) and reducible silver salts] at a coaling weight generally of less than 2.6 g/m$^2$, typically at least 1 but less than 2.0 g/m$^2$, or equal to or less than 1.9 g/m$^2$.

Reducing Agent:

The reducing agent (or reducing agent composition comprising two or more components) for the source of reducible silver ions can be any material (generally an organic material) that can reduce silver (1+) ion to metallic silver. The "reducing agent" is sometimes called a "developer" or "developing agent".

When a silver carboxylate silver source is used in a photothermographic material, one or more hindered phenol, hindered bis-phenol, or hindered tris-phenol reducing agents are typically used. Combinations of all three classes are also often useful. In some instances, the reducing agent composition comprises two or more components such as a hindered phenol or hindered bis-phenol, or hindered tris-phenol developer and a co-developer that can be chosen from the various classes of co-developers described below. Ternary mixtures involving the further addition of contrast enhancing agents are also useful. Such contrast enhancing agents can be chosen from the various classes of contrast enhancing agents described below.

"Hindered phenol reducing agents" are compounds that contain only one hydroxyl group on a given phenyl ring and have at least one additional substituent located ortho to the hydroxyl group.

One type of hindered phenol reducing agents is hindered phenols and hindered naphthols. This type of hindered phenol includes, for example, 2,6-di-t-butyl-4-methylphenol, 2,6-di-t-butyl-4-benzylphenol, 2-benzyl-4-methyl-6-t-butylphenol, 2,4-dimethyl-6-(1'-methylcyclohexyl)phenol, and 3,5-bis(1,1-dimethylethyl)-4-hydroxy-benzenepropanoic acid 2,2-bis [[3-[3,5-bis(1,1-dimethylethyl)-4-hydroxyphenyl]-1-oxopropoxy]methyl]-1,3-propanediyl ester (IRGANOX® 1010).

Another type of hindered phenol reducing agent includes hindered bis-phenols. "Hindered bis-phenols" contain more than one hydroxyl group each of which is located on a different phenyl ring. This type of hindered phenol includes, for example, binaphthols (that is dihydroxybinaphthyls), biphenols (that is dihydroxybiphenyls), bis(hydroxynaphthyl)methanes, bis(hydroxyphenyl)-methanes, bis(hydroxyphenyl)ethers, bis(hydroxyphenyl)sulfones, and bis(hydroxyphenyl)thioethers, each of which may have additional substituents.

Particularly useful hindered bis-phenol reducing agents are bis(hydroxyphenyl)methanes such as, bis(2-hydroxy-3-t-butyl-5-methylphenyl)methane, 1,1'-bis(2-hydroxy-3,5-dimethylphenyl)-3,5,5-trimethylhexane, bis[2-hydroxy-3-(1-methylcyclohexyl)-5-methylphenyl)methane, 2,6-bis[(2-hydroxy-3,5-dimethylphenyl)methyl]-4-methylphenol, 1,1'-bis(2-hydroxy-3,5-dimethylphenyl)isobutane, and 2,6-bis [(2-hydroxy-3,5-dimethylphenyl)methyl]-4-methylphenol. Such hindered bis-phenol compounds also have at least one non-hydrogen substituent ortho to the hydroxyl group and are often referred to as "hindered ortho-bis-phenols".

Additional useful reducing agents include bis-phenols having non-aromatic cyclic groups attached to the linking methylene group as described for example, in U.S. Pat. No. 6,699,649 (Nishijima et al.), bis-phenols having cycloaliphatic or alkylene groups attached to the linking methylene group as described for example in U.S. Pat. No. 7,192,695 (Sakai et al.), and bis-phenols having secondary or tertiary substituents on the phenol rings as described for example, in U.S. Pat. No. 6,485,898 (Yoshioka et al.).

In some embodiments, useful reducing agents are bis-phenol developers incorporating bicyclic and tricyclic substituents ortho to the hydroxyl group on the aromatic rings (ortho-bicyclic or tricyclic substituted bis-phenol developers). Such reducing agents are described in U.S. Pat. No. 7,241,561 (Lynch et al.). Also useful are the mixture of phenolic reducing agents described in U.S. Patent Application Publication 2008/0057450 (Ulrich et al.), co-pending and commonly assigned U.S. Ser. No. 11/507,550 (filed Aug. 21, 2006 by Ulrich, Lynch, Ishida, Zou, Skoug, and Ramsden). Additionally useful are the combinations of tris-phenol reducing agents and substituted olefinic co-developers as described in U.S. Patent Application Publication 2008/0145801 (Zou et al.). All of the above patent documents are incorporated herein by reference.

Additionally useful are the tris-phenol reducing agents represented by the following Structure (III):

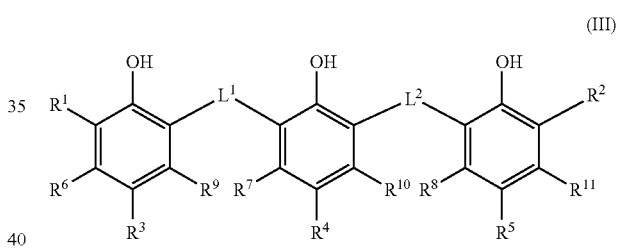

wherein L$^1$ and L$^2$ are independently sulfur or a monosubstituted or unsubstituted methylene groups, R$^1$ and R$^2$ are independently primary or secondary substituted or unsubstituted alkyl groups having 1 to 12 carbon atoms, R$^3$, R$^4$, and R$^5$ are independently substituted or unsubstituted alkyl groups having 1 to 12 carbon atoms, substituted or unsubstituted alkoxy groups having 1 to 12 carbon atoms, or halo groups, and R$^6$, R$^7$, R$^8$, R$^9$, R$^{10}$, and R$^{11}$ are independently hydrogen or any substituent that is substitutable on a benzene ring.

Typically useful tris-phenol reducing agents represented by Structure (III) are (TP-1) and (TP-2).

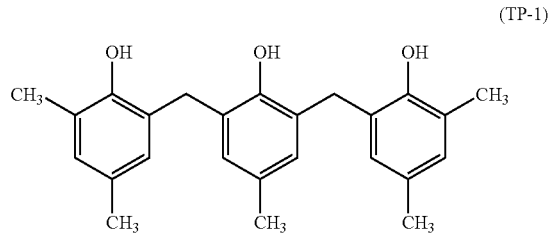

(TP-2)

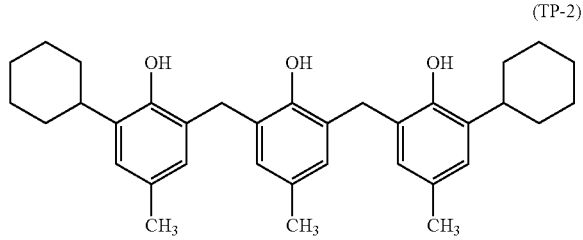

Mixtures of hindered phenol reducing agents can be used if desired, such as the mixture of a hindered phenol and a hindered bis-phenol described in U.S. Pat. No. 6,413,717 (Yoshioka et al.) and 6,645,714 (Oya et al.). Mixtures of hindered phenol, hindered bis-phenol, and hindered tris-phenol reducing agents may be used.

Still other optional reducing agents include the bis-phenol-phosphorous compounds described in U.S. Pat. No. 6,514,684 (Suzuki et al), the bis-phenol, aromatic carboxylic acid, hydrogen bonding compound mixture described in U.S. Pat. No. 6,787,298 (Yoshioka), and the compounds that can be one-electron oxidized to provide a one-electron oxidation product that releases one or more electrons as described in U.S. Pat. No. 7,303,86 (Ohzeki). Still other useful reducing agents are described in U.S. Pat. Nos. 3,074,809 (Owen), 3,080,254 (Grant, Jr.), 3,094,417 (Workman), 3,887,417 (Klein et al.), 4,030,931 (Noguchi et al.), and 5,981,151 (Leenders et al.).

Additional reducing agents that may be used include amidoximes, azines, a combination of aliphatic carboxylic acid aryl hydrazides and ascorbic acid, a reductone and/or a hydrazine, piperidinohexose reductone or formyl-4-methylphenylhydrazine, hydroxamic acids, a combination of azines and sulfonamidophenols, α-cyanophenylacetic acid derivatives, reductones, indane-1,3-diones, chromans, 1,4-dihydropyridines, and 3-pyrazolidones.

The reducing agent (or mixture thereof) described herein is generally present at from about 1 to about 25% (dry weight) of the photothermographic emulsion layer in which it is located. In multilayer constructions, if the reducing agent is added to a layer other than a photothermographic emulsion layer, slightly higher proportions, of from about 2 to 35 weight % may be more desirable. Thus, the total range for the reducing agent is from about 1 to about 35% (dry weight). Also, the reducing agent (or mixture thereof) described herein is generally present in an amount of at least 0.1 and up to and including 0.5 mol/mol of total silver in the photothermographic material, and typically in an amount of from about 0.1 to about 0.4 mol/mol of total silver.

Processing Latitude Stabilizer:

As noted above, the photothermographic material comprises one or more processing latitude stabilizers represented by Structures (I) or (II),

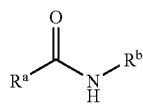
(I)

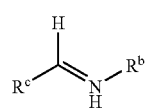
(II)

wherein $R^a$ represents a substituted or unsubstituted alkyl, cycloalkyl, alkenyl, cycloalkenyl, heterocyclic, aromatic, or heteroaromatic group, $R^b$ represents an aromatic carboxylate group whose corresponding acid has a pKa less than about 3, and $R^c$ represents a substituted or unsubstituted alkyl, cycloalkyl, alkenyl, cycloalkenyl, heterocyclic, aromatic, or heteroaromatic group.

Typically $R^a$ represents a substituted or unsubstituted alkyl or cycloalkyl group of 1 to 20 carbon atoms, or a substituted or unsubstituted aromatic group of 6 to 10 carbon atoms. More typically, $R^a$ represents a substituted or unsubstituted alkyl or cycloalkyl group of 1 to 10 carbon atoms, or a substituted or unsubstituted phenyl or naphthyl group.

Typically $R^b$ represents a substituted phenyl or naphthyl carboxyl group whose corresponding acid has a pKa less than about 3. Especially typical $R^b$ groups are phenylcarboxyl substituted with more than one fluoro, chloro, or nitro groups, or combinations thereof such as 2,4-dichlorophenylcarboxyl, 1,3,5-trichlorophenylcarboxyl, and 2-chloro-4-nitrophenylcarboxyl.

Typically $R^c$ represents a substituted or unsubstituted aromatic group of 6 to 10 carbon atoms. Especially typical $R^c$ groups are alkoxy substituted phenyl or naphthyl groups wherein the alkoxy group has 1 to 6 carbon atoms (such as o-methoxyphenyl, p-methoxyphenyl, and 2-methoxy-1-naphthyl).

Representative compounds having Structures (I) and (II) useful as processing latitude stabilizers in the practice of the present invention include the following compounds (PLS-1) through (PLS-18).

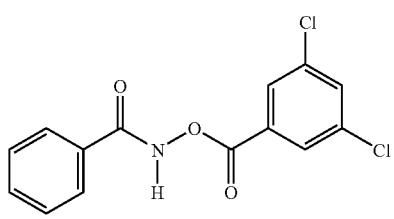
(PLS-1)

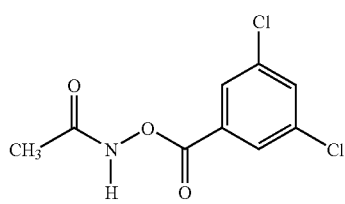
(PLS-2)

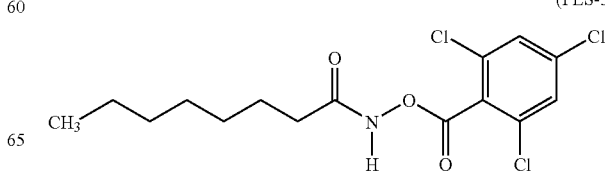
(PLS-3)

-continued
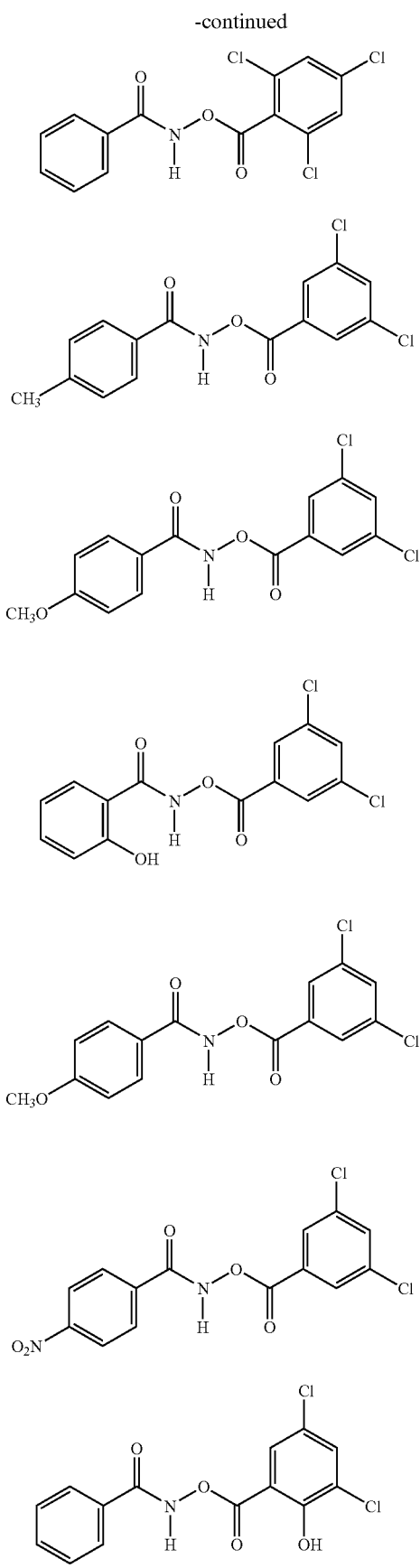
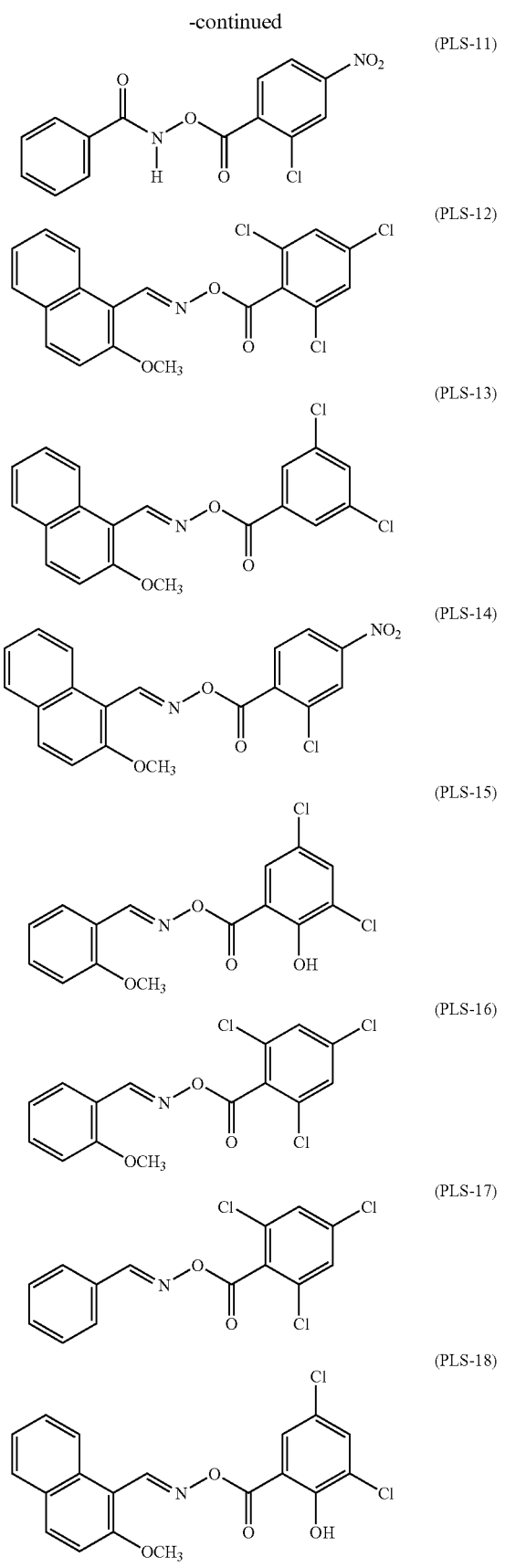

Processing latitude stabilizer compounds (PLS-1), (PLS-6), (PLS-11, (PLS-13), and (PLS-14) are typically useful.

Compounds having Structure (I) can be easily prepared using known literature methods by the reaction of a hydroxamide acid with an acid chloride in the presence of a base such as pyridine. A typical preparation is as follows.

Preparation of Compound (PLS-4): To a stirred solution of 1.0 g (0.0074 mol) of benzohydroxamide acid in 50 ml of acetonitrile was added dropwise 0.58 ml of pyridine followed by 1.14 ml (0.0073 mmol) of 2,4,6-trichlorobenzoyl chloride in 15 ml of acetonitrile. After stirring overnight at room temperature, the mixture was poured into 500 ml of water and allowed to stand until product solidified after several hours. The resulting white solid was filtered and recrystallized from toluene/pentane to give 1.91 g (75.9%) of compound (PLS-4).

Compounds having, Structure (II) can be prepared by the reaction of an appropriate aldoxime with an appropriate acid chloride or acid anhydride in the presence of a base as described in U.S. Pat. No. 4,670,373 (Kitaguchi et al.) that is incorporated herein by reference.

One or more processing latitude stabilizers can be added to any layer on the side of the support having a photothermographic emulsion layer as long as they are allowed to come into intimate contact with the emulsion layer during coating, drying, storage, thermal development, or post-processing storage. Thus, one or more processing latitude stabilizers can be added directly to the photothermographic emulsion layer or to one or more overcoat layers above the emulsion layer (for example a topcoat layer, interlayer, or barrier layer) and/or below the emulsion layer (such as to a primer layer, subbing layer, or carrier layer). Typically, one or more processing latitude stabilizers are added directly to the emulsion layer, or to an overcoat layer and allowed to diffuse into the emulsion layer.

The processing latitude stabilizers may be present in an amount of from about 0.5 to about 1% (dry weight) of the emulsion layer coating. Generally, one or more processing latitude stabilizers are present in a total amount of at least 0.10 mmol/m$^2$ in one or more layers on the imaging side of the support (for example, the emulsion layer into which they are incorporated or diffused). Typically, they are present in a total amount of from about 0.30 mmol/m$^2$ to about 0.60 mmol/m$^2$, or in a total amount of from about 90 to about 180 mg/m$^2$ in one or more layers on an imaging side of the support. The molar ratio of processing latitude stabilizer to reducing agent is generally from about 0.03:1 to about 0.30:1, and typically from about 0.05:1 to about 0.10:1.

Substituted Olefinic Co-Developer:

Co-developers are organic compounds that by themselves do not act as effective reducing agents (or developers) for the non-photosensitive silver salt, but when used in combination with a reducing agent provide, upon development, increased silver efficiency, density, or reduced development time.

The photothermographic materials contain one or more substituted olefinic co-developers described in U.S. Patent Application Publications 2008/0145801 (Zou et al.) and 2008/0145800 (Zou et al.) both of which are incorporated herein by reference. Co-developers are organic compounds that by themselves do not act as effective reducing agents (or developers) for the non-photosensitive silver salt, but when used in combination with a reducing agent provide, upon development, increased silver efficiency.

These substituted olefinic co-developers can be represented by the following Structure (IV):

wherein V and W are independently aromatic groups or electron withdrawing groups, provided that at least one of V and W is an electron-withdrawing group, or V and W can represent the atoms necessary to form a ring containing an electron-withdrawing group.

By "electron withdrawing group", we mean its Hammett $\sigma_p$ value as defined by the Hammett Equation log K/K$^\circ$=$\sigma_p\rho$ wherein K$^\circ$ is the acid dissociation constant of the reference in aqueous solution at 25° C., K is the corresponding constant for the para-substituted acid, and p is defined as 1.0 for the dissociation of para-substituted benzoic acids. A positive Hammett sigma value indicates that the substituent (or group) is electron withdrawing.

Generally useful electron withdrawing groups are those that have a Hammett $\sigma_p$ value greater than 0.2 and typically greater than 0.35. Representative electron withdrawing groups include, but are not limited to, cyano, halogens, formyl, alkoxycarbonyl groups (or carboalkoxy groups), metaloxycarbonyl groups, hydroxycarbonyl groups, nitro, acetyl, perfluoroalkyl groups, alkylsulfonyl groups, arylsulfonyl groups as well as other groups listed in *Lange's Handbook of Chemistry*, 14$^{th}$ Ed., McGraw-Hill, 1992, Chapter 9, pp. 2-7. Cyano is the useful electron-withdrawing, group in many embodiments of the invention.

The "aromatic groups" for V and W include any aromatic single or multiple ring group, with or without substitution, including but not limited to, substituted or unsubstituted phenyl, naphthyl, tolyl, pyridyl, furyl, and thienyl groups. Phenyl groups are useful groups, and halogen-substituted and haloalkyl (such as trifluoromethyl)-substituted phenyl groups are also useful especially as V groups when W is cyano. "Haloalkyl" includes alkyl groups as defined herein that have one or more of the same halo groups as substituents. Halosaturated alkyl groups (all hydrogens replaced by halo atoms) may be useful phenyl substituents.

It is also useful that V is a carboalkoxy group having 2 to 13 carbon atoms (typically 2 to 9 carbon atoms), a carboxamido group having 2 to 13 carbon atoms (typically 2 to 7 carbon atoms), or a substituted or unsubstituted aryl group having 6 to 10 carbon atoms, and W is a cyano group.

In Structure (IV), R' is a halo (such as fluoro, chloro, bromo, and iodo), hydroxyl, thiohydrocarbyl (that is any group having the connecting —S—C-group such as thioalkyl, thioaryl, thiol, thioalkenyl, and thioacyl groups), oxyhydrocarbyl (that is any group having the connecting —O—C— group such as alkoxy, aryloxy, acyloxy, alkenyloxy, and similar groups), HET, —O$^-$A$^+$, or —S$^-$A$^+$ group. The acyloxy groups include those with substituted or unsubstituted aryl (or aromatic) groups as well as those with substituted or unsubstituted alkyl groups, that is the acyloxy groups can be represented by the formula (aryl or alkyl)-(C=O)—O—.

In some embodiments, R' is a hydroxyl, alkoxy group of 1 to 24 carbon atoms, aryloxy group of 1 to 24 carbon atoms, (alkyl)-(C=O)—O— or —O$^-$A$^+$ group wherein the alkyl group in the acyloxy group has 1 to 24 carbon atoms and can be linear, branched, or cyclic. In still other embodiments, R' is hydroxyl, —O$^-$A$^+$, (primary alkyl)-(C=O)—O— group in which the primary alkyl group in the acyloxy group has 1 to 24 carbon atoms, or (secondary alkyl)-(C=O)—O— group in which the alkyl group in the acyloxy group has 1 to 24 carbon atoms. By "primary alkyl", we mean an alkyl group in which the carbon atom directly attached to the —(C=O)— group is part of an unsubstituted methylene group. By "secondary alkyl", we mean an alkyl group in which the carbon atom directly attached to the —(C=O)—O— group is part of an unsubstituted methine group.

HET represents a 5- or 6-membered heteroaromatic group attached through a non-quaternary nitrogen atom. Generally, these groups are composed of only carbon and 1 to 4 nitrogen atoms, and typically, the groups contain 2 or 3 nitrogen atoms. For example, the ring can comprise 5 ring atoms including, but is not limited to, a diazole, triazole, pyrrole, or tetrazole ring, with or without exocyclic substitution (that is inclusive of the formation of fused benzene rings forming benzodiazoles, benzotriazoles, benzotetrazoles, benzopyrroles, and similar rings, with or without additional substitution). Representative HET groups are shown as part of HET-01 and HET-02 in Col. 10 of U.S. Pat. No. 5,635,339 (noted above) which compounds are incorporated herein by reference.

$A^+$ is a cation. Typically, $A^+$ is a cation of an alkali metal, quaternary ammonium (including imidazolium), quaternary phosphonium, ternary sulfonium, or a complex cation of an alkali metal cation with a CROWN ETHER. For example, $A^+$ can be a lithium, sodium, or potassium cation, quaternary ammonium cation having 16 to 60 carbon atoms, quaternary phosphonium cation having 16 to 60 carbon atoms, or ternary sulfonium cation having 3 to 26 carbon atoms, or the complex cation of lithium, sodium, or potassium ions with a CROWN ETHER. Examples of useful quaternary ammonium and phosphonium salts, and of ternary sulfonium salts of olefinic co-developers are described in Japan Kokai 2005-338660 (Kenji), 2005-208476 (Keiko and Norio), 2003-114497 (Hiroyuki and Norio), and 2003-121964 (Hideaki and Hiroyuki).

CROWN ETHER refers to heterocyclic compounds that are, in their simplest form, substituted or unsubstituted cyclic oligomers of ethylene oxide. The essential repeating unit of any simple crown ether is ethyleneoxy, that is, —CH$_2$CH$_2$O—, which repeats twice in dioxane and six times in 18-crown-6. The nine-membered ring 1,4,7-trioxonane (9-crown-3) is often called a crown and can interact with cations. Macrocycles of the (—CH$_2$CH$_2$O—)$_n$ type in which n≧4 are generally referred to as crown ethers rather than by their systematic names. This is because the molecules formed when this special group of heterocycles binds to cations resemble a crown sitting on a head in structure. The crown ethers are notable for their ability to strongly solvate cations. The oxygen atoms are ideally situated to coordinate with a cation in the interior of the ring, whereas the exterior of the ring is hydrophobic. The result is that the complexed cation is soluble in nonpolar solvents. The size of the interior of the crown ether determines the size of the cation it can solvate. Therefore, 18-crown-6 has high affinity for potassium cation, 15-crown-5 for sodium cation, and 12-crown-4 for lithium cation. Further details of compounds containing an alkali metal cation with a CROWN ETHER are provided in U.S. Pat. No. 7,267,935 (Simpson et al.) incorporated herein by reference.

Useful substituted olefinic co-developers can be obtained from a number of commercial chemical sources such as Aldrich Chemical Co. or prepared using known starting materials and procedures as described in copending and commonly assigned U.S. Patent Application Publications 2008/0145801 (Zou et al.) and 2008/0145800 (both noted above).

Representative substituted olefinic co-developers having Structure (IV) useful in this invention include the following compounds (CD-1) to (CD-15), and mixtures thereof:

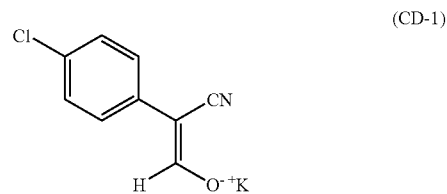
(CD-1)

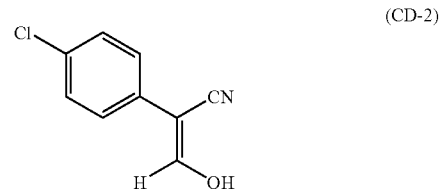
(CD-2)

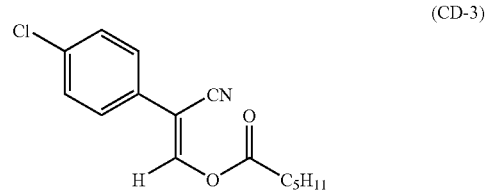
(CD-3)

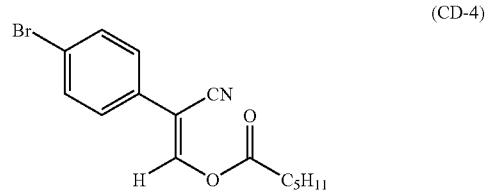
(CD-4)

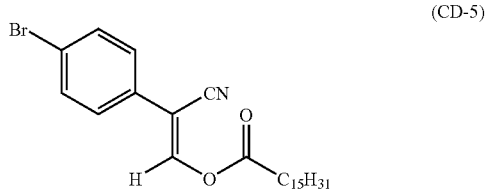
(CD-5)

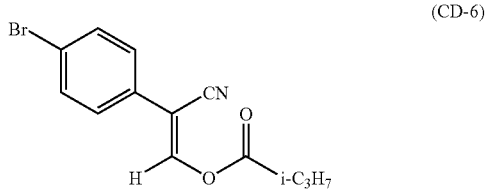
(CD-6)

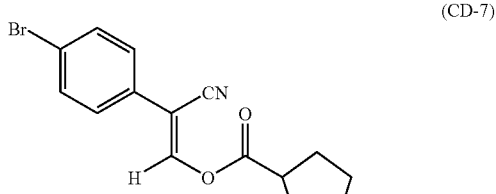
(CD-7)

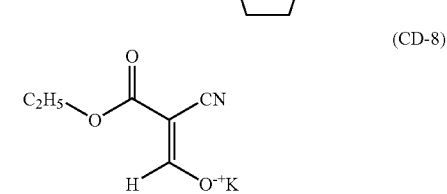
(CD-8)

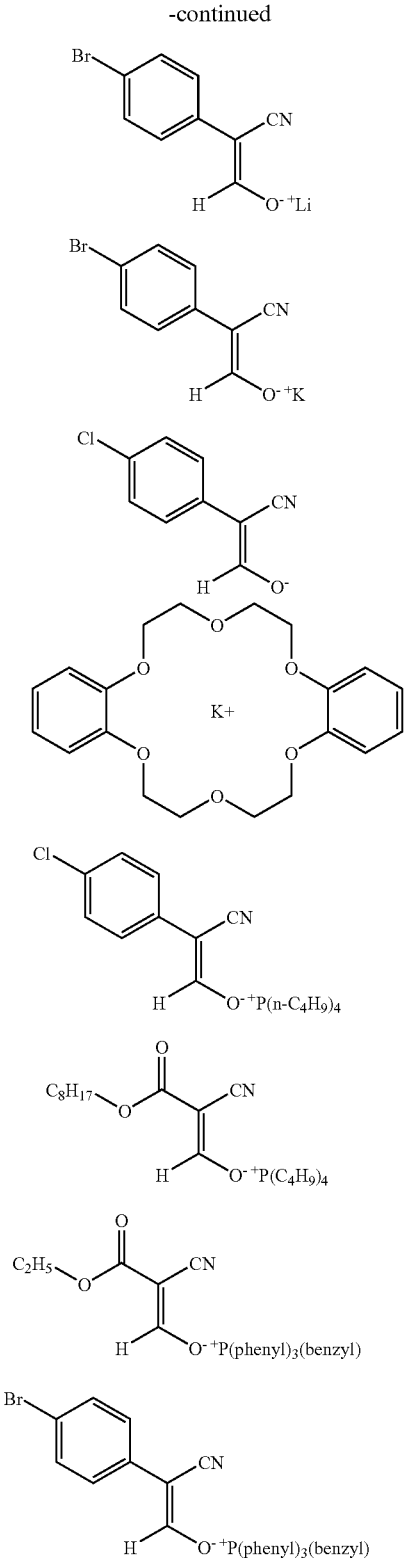

Useful co-developers are also described in U.S. Pat. No. 6,387,605 (Lynch et al.), U.S. Pat. No. 5,654,130 (Murray), and U.S. Pat. No. 5,705,324 (Murray), U.S. Pat. No. 6,100,022 (Inoue et al.), U.S. Pat. No. 5,635,339 (Murray), U.S. Pat. No. 5,545,515 (Murray et al.), and in U.S. Patent Application Publication 2008/0145788 (Simpson et al.). All of the above patents and patent applications are incorporated herein by reference.

One or more co-developers can be added to any layer on the side of the support having a photothermographic emulsion layer as long as they are allowed to come into intimate contact with the emulsion layer during coating, drying, storage, thermal development, or post-processing storage. Thus, one or more co-developers can be added directly to the photothermographic emulsion layer or to one or more overcoat layers above the emulsion layer (for example a topcoat layer, interlayer, or barrier layer) and/or below the emulsion layer (such as to a primer layer, subbing layer, or carrier layer). Typically, one or more co-developers are added directly to the emulsion layer, or to an overcoat layer and allowed to diffuse into the emulsion layer.

Where the photothermographic material has one or more photothermographic layers on both sides of the support, one or more of the same or different co-developers can be used on one or both sides of the support.

The co-developers may be present in an amount of from about 0.001% to about 20% (dry weight) of the emulsion layer coating. Generally, one or more co-developers are present in a total amount of at least 0.001 mmol/m$^2$ in one or more layers on the imaging side of the support (for example, the emulsion layer into which they are incorporated or diffused). Typically, they are present in a total amount of from about 0.005 mmol/m$^2$ to about 0.02 mmol/m$^2$, or in a total amount of from about 0.5 to about 15 mg/m$^2$ in one or more layers on an imaging side of the support. The molar ratio of co-developer to reducing agent is generally from about 0.001:1 to about 0.02:1, and typically from about 0.004:1 to about 0.01:1.

Other Addenda:

The photothermographic materials can also contain other additives such as contrast enhancing agents, shelf-life stabilizers, antifoggants, toners, development accelerators, acutance dyes, post-processing stabilizers or stabilizer precursors, thermal solvents (also known as melt formers), antistatic or conductive layers, and other image-modifying agents as would be readily apparent to one skilled in the art.

Various contrast enhancing agents can be added. Such materials are useful for preparing printing plates and duplicating films useful in graphic arts, or for nucleation of medical diagnostic films. Examples of such contrast enhancing agents are described in U.S. Pat. Nos. 6,150,084 (Ito et al.), 6,620,582 (Hirabayashi), and 6,764,385 (Wattanabe et al.). Certain contrast enhancing agents are generally used in some photothermographic materials with specific co-reducing agents. Examples of useful contrast enhancing agents include, but are not limited to, hydroxylamines, alkanolamines and ammonium phthalamate compounds as described in U.S. Pat. No. 5,545,505 (Simpson), hydroxamic acid compounds as described for example, in U.S. Pat. No. 5,545,507 (Simpson et al.), N-acylhydrazine compounds as described in U.S. Pat. No. 5,558,983 (Simpson et al.), and hydrogen atom donor compounds as described in U.S. Pat. No. 5,637,449 (Harring et al.).

Suitable stabilizers that can be used alone or in combination include thiazolium salts as described in U.S. Pat. Nos. 2,131,038 (Brooker) and 2,694,716 (Allen), azaindenes as described in U.S. Pat. No. 2,886,437 (Piper), triazaindolizines as described in U.S. Pat. No. 2,444,605 (Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. Nos. 2,566,263 (Trirelli) and 2,597,915 (Damshroder), and the heteroaromatic mercapto compounds or heteroaromatic disulfide compounds described in EP 0 559 228B1 (Philip et al.).

Heteroaromatic mercapto compounds are useful including 2-mercaptobenzimidazole, 2-mercapto-5-methylbenzimidazole, 2-mercaptobenzothiazole and 2-mercaptobenzoxazole, and mixtures thereof. A heteroaromatic mercapto compound is generally present in an emulsion layer in an amount of at least 0.0001 mole (typically from about 0.001 to about 1.0 mole) per mole of total silver in the emulsion layer.

Other useful antifoggants/stabilizers are described in U.S. Pat. No. 6,083,681 (Lynch et al.). Still other antifoggants are hydrobromic acid salts of heterocyclic compounds (such as pyridinium hydrobromide perbromide) as described in U.S. Pat. No. 5,028,523 (Skoug), benzoyl acid compounds as described in U.S. Pat. No. 4,784,939 (Pham), substituted propenenitrile compounds as described in U.S. Pat. No. 5,686,228 (Murray et al.), silyl blocked compounds as described in U.S. Pat. No. 5,358,843 (Sakizadeh et al.), the 1,3-diaryl-substituted urea compounds described in U.S. Pat. No. 7,261,999 (Hunt et al.), and tribromomethylketones as described in EP 0 600 587A1 (Oliff et al.).

Additives useful as stabilizers for improving dark stability and desktop print stability are the various boron compounds described in U.S. Patent Application Publication 2006/0141404 (Philip et al.). The boron compounds can be added in an amount of from about 0.010 to about 0.50 g/m$^2$.

Also useful as stabilizers for improving the post-processing print stability of the imaged material to heat during storage (known as "hot-dark print stability") are arylboronic acid compounds as described in U.S. Pat. No. 7,255,928 (Chen-Ho et al.) and sulfonyldiphenols as described in U.S. Pat. No. 7,258,967 (Sakizadeh et al.), both incorporated herein by reference.

The photothermographic materials can also include one or more polyhalogen stabilizers that can b(represented by the formula Q-(Y)$_n$—C(Z$_1$Z$_2$X) wherein, Q represents an alkyl, aryl (including heteroaryl) or heterocyclic group, Y represents a divalent linking group, n represents 0 or 1, Z$_1$ and Z$_2$ each represents a halogen atom, and X represents a hydrogen atom, a halogen atom, or an electron-withdrawing group. Particularly useful compounds of this type are polyhalogen stabilizers wherein Q represents an aryl group, Y represents (C=O) or SO$_2$, n is 1, and Z$_1$, Z$_2$, and X each represent a bromine atom. Examples of such compounds containing —SO$_2$CBr$_3$ groups are described in U.S. Pat. Nos. 3,874,946 (Costa et al.), 5,369,000 (Sakizadeh et al.), 5,374,514 (Kirk et al.), 5,460,938 (Kirk et al.), 5,464,747 (Sakizadet et al.) and 5,594,143 (Kirk et al.). Examples of such compounds include, but are not limited to, 2-tribromomethylsulfonyl-5-methyl-1,3,4-thiadiazole, 2-tribromomethylsulfonylpyridine, 2-tribromomethylsulfonylquinoline, and 2-tribromomethylsulfonylbenzene. The polyhalogen stabilizers can be present in one or more layers in a total amount of from about 0.005 to about 0.01 mol/mol of total silver, and typically from about 0.01 to about 0.05 mol/mol of total silver.

Stabilizer precursor compounds capable of releasing stabilizers upon application of heat during imaging can also be used, as described in U.S. Pat. Nos. 5,158,866 (Simpson et al.), 5,175,081 (Krepski et al.), 5,298,390 (Sakizadeh et al.), and 5,300,420 (Kenney et al.). Also useful are the blocked aliphatic thiol compounds described in U.S. Pat. No. 7,169,543 (Ramsden et al.).

In addition, certain substituted sulfonyl derivatives of benzotriazoles may be used as stabilizing compounds as described in U.S. Pat. No. 6,171,767 (Kong et al.).

"Toners" or derivatives thereof that improve the image are desirable components of the photothermographic materials. These compounds, when added to the imaging layer, shift the color of the image from yellowish-orange to brown-black or blue-black. Generally, one or more toners described herein are present in an amount of from about 0.01% to about 10% (more typically from about 0.1% to about 10%), based on the total dry weight of the layer in which the toner is included. Toners may be incorporated in the photothermographic emulsion or in an adjacent non-imaging layer.

Compounds useful as toners are described in U.S. Pat. Nos. 3,080,254 (Grant, Jr.), 3,847,612 (Winslow), 4,123,282 (Winslow), 4,082,901 (Laridon et al.), 3,074,809 (Owen), 3,446,648 (Workman), 3,844,797 (Willems et al.), 3,951,660 (Hagemann et al.), 5,599,647 (Defieuw et al.) and GB 1,439,478 (AGFA).

Additional useful toners are substituted and unsubstituted mercaptotriazoles as described in U.S. Pat. Nos. 3,832,186 (Masuda et al.), 6,165,704 (Miyake et al.), 5,149,620 (Simpson et al.), 6,713,240 (Lynch et al.), and 6,841,343 (Lynch et al.).

Phthalazine and phthalazine derivatives [such as those described in U.S. Pat. No. 6,146,822 (Asanuma et al.)], phthalazinone, and phthalazinone derivatives are particularly useful toners.

Useful phthalazinone compounds are those having sufficient solubility to completely dissolve in the formulation from which they are coated. Representative phthalazinone compounds include 6,7-dimethoxy-1-(2H)-phthalazinone, 4-(4-pentylphenyl)-1-(2H)-phthalazinone, and 4-(4-cyclohexylphenyl)-1-(2H)-phthalazinone. Mixtures of such phthalazinone compounds can be used if desired.

The addition of development accelerators that increase the rate of image development and allow reduction in silver coating weight is also useful. Suitable development accelerators include phenols, naphthols, and hydrazinecarboxamides. Such compounds are described, for example, in Y. Yoshioka, K. Yamane, T. Ohzeki, *Development of Rapid Dry Photothermographic Materials with Water-Base Emulsion Coating Method*, AgX 2004: The International Symposium on Silver Halide Technology "At the Forefront of Silver Halide Imaging", Final Program and Proceedings of IS&T and SPSTJ, Ventura, Calif., Sep. 13-15, 2004, pp. 28-31, Society for Imaging Science and Technology, Springfield, Va., U.S. Pat. Nos. 6,566,042 (Goto et al.), 7,129,032 (Mori et al.), and 7,267,934 (Goto), and U.S. Patent Application Publications 2004/234906 (Ohzeki et al.), and 2005/048422 (Nakagawa).

Thermal solvents (or melt formers) can also be used, including combinations of such compounds (for example, a combination of succinimide and dimethylurea). Thermal solvents are compounds which are solids at ambient temperature but which melt at the temperature used for processing. The thermal solvent acts as a solvent for various components of the photothermographic material, it helps to accelerate thermal development and it provides the medium for diffusion of various materials including silver ions and/or complexes and reducing agents. Known thermal solvents are disclosed in U.S. Pat. Nos. 3,438,776 (Yudelson), 5,064,753 (noted above) 5,250,386 (Aono et al.), 5,368,979 (Freedman et al.), 5,716,772 (Taguchi et al.), and 6,013,420 (Windender). Thermal solvents are also described in U.S. Published U.S. Pat. No. 7,169,544 (Chen-Ho et al.).

The photothermographic materials can also include one or more image stabilizing compounds that are usually incorporated in a "backside" layer. Such compounds can include phthalazinone and its derivatives, pyridazine and its derivatives, benzoxazine and benzoxazine derivatives, benzothiazine dione and its derivatives, and quinazoline dione and its derivatives, particularly as described in U.S. Pat. No. 6,599,685 (Kong). Other useful backside image stabilizers include anthracene compounds, coumarin compounds, benzophenone compounds, benzotriazole compounds, naphthalic acid imide compounds, pyrazoline compounds, or compounds described in U.S. Pat. No. 6,465,162 (Kong et al) and GB 1,565,043 (Fuji Photo).

Phosphors are materials that emit infrared, visible, or ultraviolet radiation upon excitation and can be incorporated into the photothermographic materials. Particularly useful phosphors are sensitive to X-radiation and emit radiation primarily in the ultraviolet, near-ultraviolet, or visible regions of the spectrum (that is, from about 100 to about 700 nm). An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants or activators "activate" the phosphor and cause it to emit ultraviolet or visible radiation. Multiple dopants may be used and thus the phosphor would include both "activators" and "co-activators".

Any conventional or useful phosphor can be used, singly or in mixtures. For example, useful phosphors are described in numerous references relating to fluorescent intensifying screens as well as U.S. Pat. Nos. 6,440,649 (Simpson et al.) and 6,573,033 (Simpson et al.) that are directed to photothermographic materials. Some particularly useful phosphors are primarily "activated" phosphors known as phosphate phosphors and borate phosphors. Examples of these phosphors are rare earth phosphates, yttrium phosphates, strontium phosphates, or strontium fluoroborates (including cerium activated rare earth or yttrium phosphates, or europium activated strontium fluoroborates) as described in U.S. Pat. No. 7,074,549 (Simpson et al.).

The one or more phosphors can be present in the photothermographic materials in an amount of at least 0.1 mole per mole, and typically from about 0.5 to about 20 mole, per mole of total silver in the photothermographic material. As noted above, generally, the amount of total silver is at least 0.002 mol/m$^2$. While the phosphors can be incorporated into any imaging layer on one or both sides of the support, typically they are in the same layer(s) as the photosensitive silver halide(s) on one or both sides of the support.

It is also useful that the photothermographic materials include one or more nucleation promoting phosphonium salts in the photothermographic emulsion layer or in a layer adjacent thereto. Such compounds have been described in U.S. Pat. Nos. 5,968,725 (Katoh and Sakai), 6,090,538 (Arai et al.), and 6,203,972 (Katoh et al.).

Binder:

The photosensitive silver halide the non-photosensitive source of reducible silver ions, the reducing agent composition, substituted olefinic co-developer, and any other imaging layer additives are generally combined with one or more binders that are generally hydrophobic or hydrophilic in nature. Thus, either aqueous or organic solvent-based formulations can be used to prepare the thermally developable materials. Mixtures of either or both types of binders can also be used. Generally the binder is selected from predominantly hydrophobic polymeric materials (at least 50 dry weight % of total binders) and the imaging layer formulation (and other layer formulations) is coated out of one or more organic solvents (described below).

Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral, polyvinyl acetal, and polyvinyl formal) and vinyl copolymers (such as polyvinyl acetate and polyvinyl chloride) are particularly useful. Suitable hydrophobic binders are polyvinyl butyral resins that are available under the names MOWITAL® (Kuraray America, New York, N.Y.), S-LEC® (Sekisui Chemical Company, Troy, Mich.), BUTVAR® (Solutia, Inc., St. Louis, Mo.) and PIOLOFORM® (Wacker Chemical Company, Adrian, Mich.).

Hydrophilic binders or water-dispersible polymeric latex polymers can also be present in the formulations. Examples of useful hydrophilic binders include, but are not limited to, proteins and protein derivatives, gelatin and gelatin-like derivatives (hardened or unhardened), cellulosic materials such as hydroxymethyl cellulose and cellulosic esters, acrylamide/methacrylamide polymers, acrylic/methacrylic polymers polyvinyl pyrrolidones, polyvinyl alcohols, poly(vinyl lactams), polymers of sulfoalkyl acrylate or methacrylates, hydrolyzed polyvinyl acetates, polyacrylamides, polysaccharides and other synthetic or naturally occurring vehicles commonly known for use in aqueous-based photographic emulsions (see for example, *Research Disclosure*, item 38957, noted above). Cationic starches can also be used as a peptizer for tabular silver halide grains as described in U.S. Pat. Nos. 5,620,840 (Maskasky) and 5,667,955 (Maskasky).

One embodiment of the polymers capable of being dispersed in aqueous solvent includes hydrophobic polymers such as acrylic polymers, polyester, rubber (for example, SBR resin), polyurethane, poly(vinyl chloride), poly(vinyl acetate), poly(vinylidene chloride), polyolefin, and the like. As the polymers above, usable are straight chain polymers, branched polymers, or crosslinked polymers. Also usable are the so-called homopolymers in which single monomer is polymerized, or copolymers in which two or more types of monomers are polymerized. In the case of a copolymer, it may be a random copolymer or a block copolymer. The number average molecular weight of these polymers is in the range from 5,000 to 1,000,000. Further, crosslinking polymer latexes are particularly also useful.

Styrene-butadiene copolymers are also useful as the polymer latex for use as a binder. The weight ratio of monomer unit for styrene to that of butadiene constituting the styrene-butadiene copolymer is generally in the range of from 40:60 to 95:5. Further, the monomer unit of styrene and that of butadiene typically account for 60% by weight to 99% by weight with respect to the copolymer. Moreover, the polymer latex contains acrylic acid or methacrylic acid, for example, in the range from 1% by weight to 6% by weight, and typically, from 2% by weight to 5% by weight, with respect to the total weight of the monomer unit of styrene and that of butadiene. The range of the molecular weight is the same as that described above.

Examples of latexes include styrene-(50) butadiene-(47) methacrylic acid (3), styrene-(60) butadiene-(35) divinylbenzene-methyl methacrylate-(3) methacrylic acid-(2), styrene-(70.5) butadiene-(26.5) acrylic acid-(3) and commercially available LACSTAR-3307B, 7132C, and Nipol Lx416. Such latexes are described in U.S. Pat. No. 7,196,952 (Sakai et al.).

Hardeners for various binders may be present if desired. Useful hardeners are well known and include diisocyanate compounds as described in EP 0 600 586 B1 (Philip, Jr. et al.), vinyl sulfone compounds as described in U.S. Pat. No. 6,143,487 (Philip, Jr. et al.) and EP 0 640 589 A1 (Gathmann et al.), aldehydes and various other hardeners as described in U.S. Pat. No. 6,190,822 (Dickerson et al.). The hydrophilic binders used in the photothermographic materials are generally partially or fully hardened using any conventional hardener. Useful hardeners are well known and are described, for example, in T. H. James, *The Theory of the Photographic Process*, Fourth Edition, Eastman Kodak Company, Rochester, N.Y., 1977, Chapter 2, pp. 77-8.

Where the proportions and activities of the photothermographic materials require a particular developing time and temperature, the binder(s) should be able to withstand those conditions. When a hydrophobic binder is used, it is desired that the binder (or mixture thereof) does not decompose or lose its structural integrity at 120° C. for 60 seconds. When a hydrophilic binder is used, it is desired that the binder does not decompose or lose its structural integrity at 150° C. for 60 seconds. In some embodiments the binder should not decompose or lose its structural integrity at 177° C. for 60 seconds.

The polymer binder(s) is used in an amount sufficient to carry the components dispersed therein. For example, a binder is used at a level of from about 10% to about 90% by weight (typically at a level of from about 20% to about 70% by weight) based on the total dry weight of the layer. It is also useful that the photothermographic materials include at least 50 weight % hydrophobic binders in both imaging and non-imaging layers on both sides of the support.

Support Material:

The photothermographic materials comprise a polymeric support that is typically a flexible, transparent film that has any desired thickness and is composed of one or more polymeric materials. They are required to exhibit dimensional stability during thermal development and to have suitable adhesive properties with overlying layers. Useful polymeric materials for making such supports include polyesters [such as poly(ethylene terephthalate) and poly(ethylene naphthalate)], cellulose acetate and other cellulose esters, polyvinyl acetal, polyolefins, polycarbonates, and polystyrenes. Useful supports are composed of polymers having good heat stability, such as polyesters and polycarbonates. Support materials may also be treated or annealed to reduce shrinkage and promote dimensional stability.

Also useful are transparent, multilayer, polymeric supports comprising numerous alternating layers of at least two different polymeric materials as described in U.S. Pat. No. 6,630,283 (Simpson et al.). Another support comprises dichroic mirror layers as described in U.S. Pat. No. 5,795,708 (Boutet).

Opaque supports can also be used, such as dyed polymeric films and resin-coated papers that are stable to high temperatures.

Support materials can contain various colorants, pigments, antihalation or acutance dyes if desired. For example, the support can include one or more dyes that provide a blue color in the resulting imaged film. Support materials may be treated using conventional procedures (such as corona discharge) to improve adhesion of overlying layers, or subbing or other adhesion-promoting layers can be used.

Photothermographic Formulations and Constructions:

An organic solvent-based coating formulation for the photothermographic emulsion layer(s) can be prepared by mixing the various components with one or more binders in a suitable organic solvent system that usually includes one or more solvents such as toluene, 2-butanone (methyl ethyl ketone), acetone, or tetrahydrofuran, or mixtures thereof. Methyl ethyl ketone is a useful coating solvent.

Alternatively, the desired imaging components can be formulated with a hydrophilic binder (such as gelatin, or a gelatin-derivative) or a hydrophobic water-dispersible polymer latex (such as a styrene-butadiene latex) in water or water-organic solvent mixtures to provide aqueous-based coating formulations.

The photothermographic materials can contain plasticizers and lubricants such as poly(alcohols) and diols as described in U.S. Pat. No. 2,960,404 (Milton et al.), fatty acids or esters as described in U.S. Pat. Nos. 2,588,765 (Robijns) and 3,121,060 (Duane), and silicone resins as described in GB 955,061 (DuPont). The materials can also contain inorganic and organic matting agents as described in U.S. Pat. Nos. 2,992,101 (Jelley et al.) and 2,701,245 (Lynn). Polymeric fluorinated surfactants may also be useful in one or more layers as described in U.S. Pat. No. 5,468,603 (Kub).

The photothermographic materials may also include a surface protective layer over the one or more emulsion layers. Layers to reduce emissions from the material may also be present, including the polymeric barrier layers described in U.S. Pat. Nos. 6,352,819 (Kenney et al.), 6,352,820 (Bauer et al.), 6,420,102 (Bauer et al.), 6,667,148 (Rao et al.), and 6,746,831 (Hunt).

U.S. Pat. No. 6,436,616 (Geisler et al.) describes various means of modifying photothermographic materials to reduce what is known as the "woodgrain" effect, or uneven optical density.

To promote image sharpness, the photothermographic materials can contain one or more layers containing acutance and/or antihalation dyes. These dyes are chosen to have absorption close to the exposure wavelength and are designed to absorb scattered light. One or more antihalation compositions may be incorporated into the support, backside layers, underlayers, or overcoat layers. Additionally, one or more acutance dyes may be incorporated into one or more frontside imaging layers.

Dyes useful as anti halation and acutance dyes include squaraine dyes as described in U.S. Pat. Nos. 5,380,635 (Gomez et al.), and 6,063,560 (Suzuki et al.), and EP 1 083 459A1 (Kimura), indolenine dyes as described in EP 0 342 810A1 (Leichter), and cyanine dyes as described in U.S. Pat. No. 6,689,547 (Hunt et al.).

It may also be useful to employ compositions including acutance or antihalation dyes that will decolorize or bleach with heat during processing as described in U.S. Pat. Nos. 5,135,842 (Kitchin et al.), 5,266,452 (Kitchin et al.), 5,314,795 (Helland et al.), and 6,306,566, (Sakurada et al.), and Japan Kokai 2001-142175 (Hanyu et al.) and 2001-183770 (Hanyu et al.). Useful bleaching compositions are described in Japan Kokai 11-302550 (Fujiwara), 2001-109101 (Adachi), 2001-51371 (Yabuki et al.), and 2000-029168 (Noro).

Other useful heat-bleachable antihalation compositions can include an infrared radiation absorbing compound such as an oxonol dye or various other compounds used in combination with a hexaarylbiimidazole (also known as a "HABI"), or mixtures thereof. HABI compounds are described in U.S. Pat. Nos. 4,196,002 (Levinson et al.), 5,652,091 (Perry et al.), and 5,672,562 (Perry et al.). Examples of such heat-bleachable compositions are described for example in U.S. Pat. Nos. 6,455,210 (Irving et al.), 6,514,677 (Ramsden et al.), and 6,558,880 (Goswami et al.).

Under practical conditions of use, these compositions are heated to provide bleaching at a temperature of at least 90° C.

for at least 0.5 seconds (typically, at a temperature of from about 100° C. to about 200° C. for from about 5 to about 20 seconds).

Mottle and other surface anomalies can be reduced by incorporating a fluorinated polymer as described, for example, in U.S. Pat. No. 5,532,121 (Yonkoski et al.) or by using particular drying techniques as described, for example in U.S. Pat. No. 5,621,983 (Ludemann et al.).

It is useful for the photothermographic material to include one or more radiation absorbing substances that are generally incorporated into one or more photothermographic layer(s) to provide a total absorbance of all layers on that side of the support of at least 0.1 (typically of at least 0.6) at the exposure wavelength of the photothermographic material. Where the imaging layers are on one side of the support only, it is also desired that the total absorbance at the exposure wavelength for all layers on the backside (non-imaging) side of the support be at least 0.2.

Photothermographic formulations can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. Nos. 2,761,791 (Russell), 4,001,024 (Dittman et al.), 4,569,863 (Keopke et al.), 5,340,613 (Hanzalik et al.), 5,405,740 (LaBelle), 5,415,993 (Hanzalik et al.), 5,525,376 (Leonard), 5,733,608 (Kessel et al.), 5,849,363 (Yapel et al.), 5,843,530 (Jerry et al.), and 5,861,195 (Bhave et al.), and GB 837,095 (Ilford). A typical coating gap for the emulsion layer can be from about 10 to about 750 µm, and the layer can be dried in forced air at a temperature of from about 20° C. to about 100° C. The thickness of the layer can be selected to provide maximum image densities greater than about 0.2, and typically, from about 0.5 to 5.0 or more, as measured by an X-rite Model 361/V Densitometer equipped with 301 Visual Optics, available from X-rite Corporation, (Granville, Mich.).

In general, two or more layer formulations are simultaneously applied to a support using slide coating techniques, the first layer being coated on top of the second layer while the second layer is still wet. The first and second fluids used to coat these layers can be the same or different solvents. For example, subsequently to, or simultaneously with, application of the emulsion formulation(s) to the support, a protective overcoat formulation can be applied over the emulsion formulation. Simultaneous coating can be used to apply layers on the frontside, backside, or both sides of the support.

In other embodiments, a "carrier" layer formulation comprising a single-phase mixture of two or more polymers described above may be applied directly onto the support and thereby located underneath the emulsion layer(s) as described in U.S. Pat. No. 6,355,405 (Ludemann et al.). The carrier layer formulation can be simultaneously applied with application of the emulsion layer formulation(s) and any overcoat or surface protective layers.

The photothermographic materials can include one or more antistatic or conductive layers agents in any of the layers on either or both sides of the support. Conductive components include soluble salts, evaporated metal layers, or ionic polymers as described in U.S. Pat. Nos. 2,861,056 (Minsk) and 3,206,312 (Sterman et al.), insoluble inorganic salts as described in U.S. Pat. No. 3,428,451 (Trevoy), electroconductive underlayers as described in U.S. Pat. No. 5,310,640 (Markin et al.), electronically-conductive metal antimonate particles as described in U.S. Pat. No. 5,368,995 (Christian et al.), and electrically-conductive metal-containing particles dispersed in a polymeric binder as described in EP 0 678 776 A1 (Melpolder et al.). Particularly useful conductive particles are the non-acicular metal antimonate particles used in a buried backside conductive layer as described and in U.S. Pat. Nos. 6,689,546 (LaBelle et al.), 7,018,787 (Ludemann et al.), 7,022,467 (Ludemann et al.), 7,087,364 (Ludemann et al.), and 7,067,242 (Ludemann et al.) and in U.S. Patent Application Publication 2006/0046932.

It is particularly useful that the conductive layers be disposed on the backside of the support and especially where they are buried or underneath one or more other layers such as backside protective layer(s). Such backside conductive layers typically have a resistivity of about $10^5$ to about $10^{12}$ ohm/sq as measured using a salt bridge water electrode resistivity measurement technique. This technique is described in R. A. Elder *Resistivity Measurements on Buried Conductive Layers*, EOS/ESD Symposium Proceedings, Lake Buena Vista, Fla., 1990, pp. 251-254, incorporated herein by reference. [EOS/ESD stands for Electrical Overstress/Electrostatic Discharge].

Still other conductive compositions include one or more fluorochemicals each of which is a reaction product of $R_f$—$CH_2CH_2$—$SO_3H$ with an amine wherein $R_f$ comprises 4 or more fully fluorinated carbon atoms as described in U.S. Pat. No. 6,699,648 (Sakizadeh et al.). Additional conductive compositions include one or more fluorochemicals described in more detail in U.S. Pat. No. 6,762,013 (Sakizadeh et al.).

The photothermographic materials may also usefully include a magnetic recording material as described in *Research Disclosure*, Item 34390, November 1992, or a transparent magnetic recording layer such as a layer containing magnetic particles on the underside of a transparent support as described in U.S. Pat. No. 4,302,523 (Audran et al.).

While the carrier End emulsion layers can be coated on one side of the film support, manufacturing methods can also include forming on the opposing or backside of the polymeric support, one or more additional layers, including a conductive layer, anti halation layer, or a layer containing a matting agent (such as silica), or a combination of such layers. Alternatively, one backside layer can perform all of the desired functions.

In some embodiments, a conductive "carrier" layer formulation comprising a single-phase mixture of two or more polymers and non-acicular metal antimonate particles, may be applied directly onto the backside of the support and thereby be located underneath other backside layers. The carrier layer formulation can be simultaneously applied with application of these other backside layer formulations.

Layers to promote adhesion of one layer to another are also known, such as those described in U.S. Pat. Nos. 5,891,610 (Bauer et al.), 5,804,365 (Bauer et al.), and 4,741,992 (Przezdziecki). Adhesion can also be promoted using specific polymeric adhesive materials as described in U.S. Pat. No. 5,928,857 (Geisler et al.).

It is also contemplated that the photothermographic materials include one or more photothermographic layers on both sides of the support and/or an antihalation underlayer beneath at least one photothermographic layer on at least one side of the support. In addition, the materials can have an outermost protective layer disposed over all photothermographic layers on both sides of the support.

Imaging/Development:

The photothermographic materials can be imaged in any suitable manner consistent with the type of material, using any suitable imaging source to which they are sensitive (typically some type of radiation or electronic signal). In some embodiments, the materials are sensitive to radiation in the range of from about at least 100 nm to about 1400 nm. In some embodiments, the materials are generally sensitive to radiation in the range of from about 300 nm to about 600 nm, typically from about 300 to about 450 nm, or from a wavelength of from about 360 to 420 nm. In other embodiments the materials are sensitized to radiation from about 600 to about 1200 nm and typically to infrared radiation from about 700 to about 950 nm. If necessary, sensitivity to a particular wavelength can be achieved by using appropriate spectral sensitizing dyes.

Imaging can be carried out by exposing the photothermographic materials to a suitable source of radiation to which they are sensitive, including X-radiation, ultraviolet radiation, visible light, near infrared radiation, and infrared radiation to provide a latent image. Suitable exposure means are well known and include phosphor emitted radiation (particularly X-ray induced phosphor emitted radiation), incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art such as described in *Research Disclosure*, item 38957 (noted above). Particularly useful infrared exposure means include laser diodes emitting at from about 700 to about 950 nm, including laser diodes that are modulated to increase imaging efficiency using what is known as multi-longitudinal exposure techniques as described in U.S. Pat. No. 5,780,207 (Mohapatra et al.). Other exposure techniques are described in U.S. Pat. No. 5,493,327 (McCallum et al.).

The photothermographic materials also can be indirectly imaged using an X-radiation imaging source and one or more prompt-emitting or storage X-radiation sensitive phosphor screens adjacent to the photothermographic material. The phosphors emit suitable radiation to expose the photothermographic material. Useful X-ray screens are those having phosphors emitting in the near ultraviolet region of the spectrum (from 300 to 400 nm), in the blue region of the spectrum (from 400 to 500 nm), and in the green region of the spectrum (from 500 to 600 nm).

In other embodiments, the photothermographic materials can be imaged directly using an X-radiation imaging source to provide a latent image.

Thermal development conditions will vary, depending on the construction used but will typically involve heating the imagewise exposed photothermographic material at a suitably elevated temperature, for example, at from about 50° C. to about 250° C. (typically from about 80° C. to about 200° C. or from about 100° C. to about 200° C.) for a sufficient period of time, generally from about 1 to about 120 seconds. Heating can be accomplished using any suitable heating means such as contacting the material with a heated drum, plates, or rollers, or by providing a heating resistance layer on the rear surface of the material and supplying electric current to the layer so as to heat the material. One useful heat development procedure for photothermographic materials includes heating within a temperature range of from 110 to 150° C. for 25 seconds or less, for example, at least 3 and up to 25 seconds (and typically for 20 seconds or less) to develop the latent image into a visible image saving a maximum density ($D_{max}$) of at least 3.0. Line speeds during development of greater than 61 cm/min, such as from 61 to 200 cm/min, can be used.

Thermal development of photothermographic materials is carried out with the material being in a substantially water-free environment and without application of any solvent to the material.

Use as a Photomask:

The photothermographic materials can be sufficiently transmissive in the range of from about 350 to about 450 nm in non-imaged areas to allow their use in a method where there is a subsequent exposure of an ultraviolet or short wavelength visible radiation sensitive imagable medium. The photothermographic materials at sorb ultraviolet or short wavelength visible radiation in the areas where there is a visible image and transmit ultraviolet or short wavelength visible radiation where there is no visible image. The photothermographic materials may then be used as a mask and positioned between a source of imaging radiation (such as an ultraviolet or short wavelength visible radiation energy source) and an imagable material that is sensitive to such imaging radiation, such as a photopolymer, diazo material, photoresist, or photosensitive printing plate. Exposing the imagable material to the imaging radiation through the visible image in the exposed and heat-developed photothermographic material provides an image in the imagable material. This method is particularly useful where the imagable medium comprises a printing plate and the photothermographic material serves as an image-setting film.

Thus, in some other embodiments wherein the photothermographic material comprises a transparent support, the image-forming method further comprises, after steps (A) and (B) or step (A') noted above:

(C) positioning the exposed and heat-developed photothermographic material between a source of imaging radiation and an imagable material that is sensitive to the imaging radiation, and (D) exposing the imagable material to the imaging radiation through the visible image in the exposed and heat-developed photothermographic material to provide an image in the imagable material.

The following examples are provided to illustrate the practice of the present invention and the invention is not meant to be limited thereby.

MATERIALS AND METHODS FOR THE EXAMPLES

All materials used in the following examples are readily available from standard commercial sources, such as Aldrich Chemical Co. (Milwaukee Wis.) unless otherwise specified. All percentages are by weight unless otherwise indicated. The following additional terms and materials were used.

Many of the chemical components used herein are provided as a solution. The term "active ingredient" means the amount or the percentage of the desired chemical component contained in a sample. All amounts listed herein are the amount of active ingredient added unless otherwise specified.

PARALOID® A-21 is an acrylic copolymer available from Rohm and Haas (Philadelphia, Pa.).

BZT is benzotriazole.

CAB 171-15S is a cellulose acetate butyrate resin available from Eastman Chemical Co (Kingsport, Tenn.).

DESMODUR® N3300 is a trimer of an aliphatic hexamethylene diisocyanate available from Bayer Chemicals (Pittsburgh, Pa.).

PIOLOFORM® BL-16 is reported to be a polyvinyl butyral resin having a glass transition temperature of about 84° C. PIOLOFORM® BM-18 is reported to be a polyvinyl butyral resin having glass transition temperature of about 70° C. Both are available from Wacker Polymer Systems (Adrian, Mich.).

MEK is methyl ethyl ketone (or 2-butanone).

Vinyl Sulfone-1 (VS-1) is described in U.S. Pat. No. 6,143,487 and has the structure shown below.

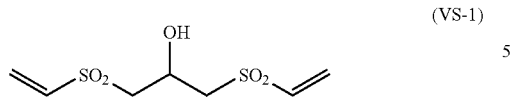
(VS-1)

Antifoggant AF-A is 2-pyridyltribromomethylsulfone and has the structure shown below.

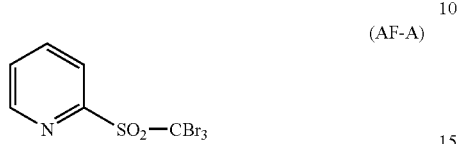
(AF-A)

Antifoggant AF-B is ethyl-2-cyano-3-oxobutanoate. It is described in U.S. Pat. No. 5,686,228 (Murray et al.) and has the structure shown below.

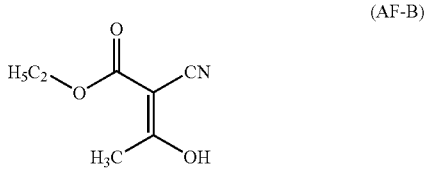
(AF-B)

Developer-1 (TP-1) has the structure shown below.

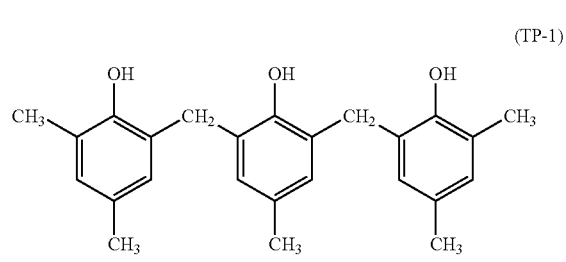
(TP-1)

Developer-2 (DEV-2) has the structure shown below.

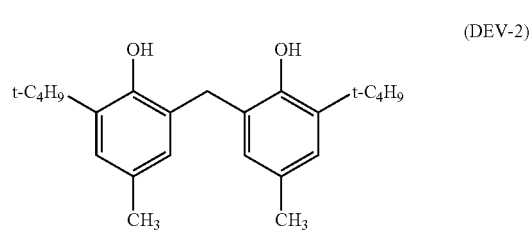
(DEV-2)

Acutance Dye AD-1 has the following structure:

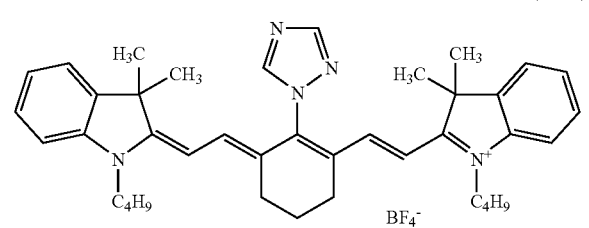
(AD-1)

Tinting Dye TD-1 has the following structure:

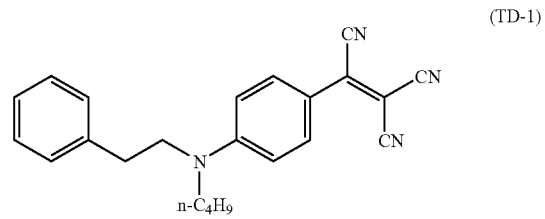
(TD-1)

Sensitizing Dye A is described in U.S. Pat. No. 5,541,054 (Miller et al.) has the structure shown below.

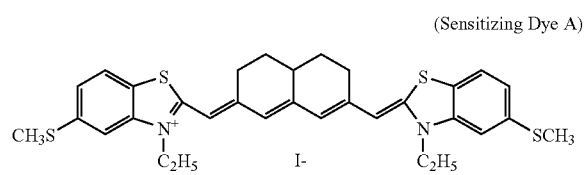
(Sensitizing Dye A)

(Sensitizing Dye A)

Support Dye SD-1 has the following structure:

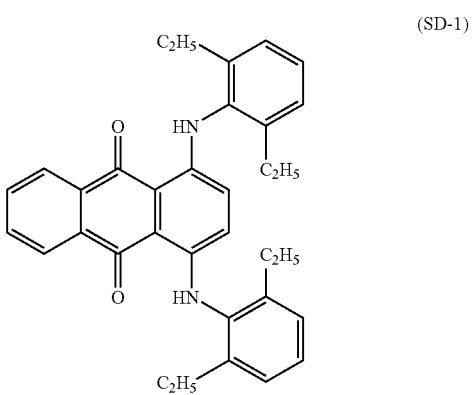
(SD-1)

Comparative Compounds:
The following comparative compounds were used.

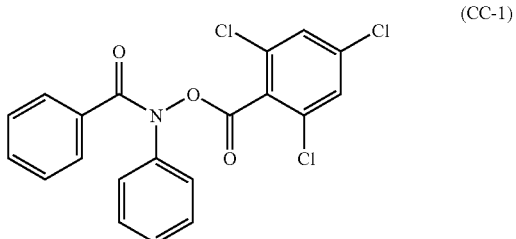
(CC-1)

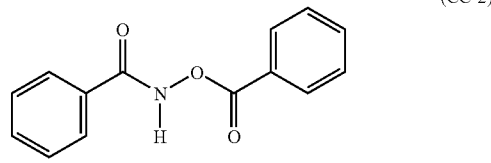
(CC-2)

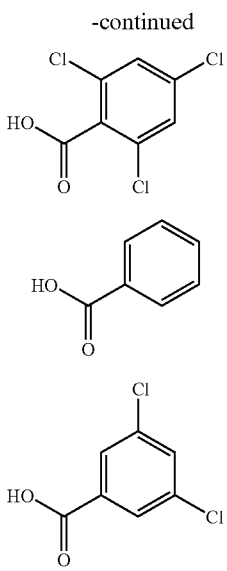

(CC-3)

(CC-4)

(CC-5)

EXAMPLE 1

This example compares photothermographic materials incorporating processing latitude stabilizers (PLS-1) or (PLS-2) to similarly prepared materials containing either no processing latitude stabilizer (control) or 3,5-dichlorobenzoic acid (CC-5, a comparative compound). This example shows that incorporation of PLS compounds reduces changes in AC-1, AC-2 or AC-3 with little change in silver efficiency or Speed-2 when compared with samples containing no PLS compound when the development time for the imaged materials was increased from 15 to 25 seconds under high humidity conditions.

Preparation of Photothermographic Emulsion Formulation:

A preformed silver halide, silver carboxylate soap dispersion, was prepared in similar fashion to that described in U.S. Pat. No. 5,939,249 (noted above). The core-shell silver halide emulsion had a silver iodobromide core with 8% iodide, and a silver bromide shell doped with iridium and copper. The core made up 25% of each silver halide grain, and the shell made up the remaining 75%. The silver halide grains were cubic in shape, and had a mean grain size between 0.055 and 0.06 μm. The preformed silver halide, silver carboxylate soap dispersion was made by mixing 26.1% preformed silver halide, silver carboxylate soap, 2.1% PIOLOFORM® BM-18 polyvinyl butyral binder, and 71.8% MEK, and homogenizing three times at 3000 psi (55 MPa).

A photothermographic emulsion formulation was prepared at 67° F. (19.4° C.) containing 174 parts of the above preformed silver halide, silver carboxylate soap dispersion, and 4.6 parts MEK. To this formulation was added 1.6 parts of a 15% solution of pyridinium hydrobromide perbromide in methanol, with stirring. After 45 minutes of mixing, 2.1 parts of an 11% zinc bromide solution in methanol was added. Stirring was continued and after 30 minutes, a solution of 0.18 parts 2-mercapto-5-methylbenzimidazole, 0.009 parts of Sensitizing Dye A, 2.0 parts of 2-(4-chlorobenzoyl)benzoic acid, 10.8 parts of methanol, and 3.4 parts of MEK were added. After stirring for 75 minutes, the temperature was lowered to 50° F. (10° C.), and 37.6 parts of PIOLOFORM® BM-18, and 21.2 parts of PIOLCFORM® BL-16, and 50.9 parts of MEK were added. Mixing was continued for another 15 minutes.

The emulsion formulation was completed by adding the materials shown below. Five minutes were allowed between the additions of each component.

| Solution A containing: | |
| --- | --- |
| Antifoggant AF-A | 0.80 parts |
| Tetrachlorophthalic acid | 0.37 parts |
| 4-Methylphthalic acid | 1.07 parts |
| MEK | 21 parts |
| Methanol | 0.36 parts |
| Developer-1 (TP-1) | 6.03 parts |
| Developer-2 (DEV-2) | 1.64 parts |
| DESMODUR ® N3300 Solution | 0.66 parts in 0.33 parts MEK |
| Phthalazine solution | 1.42 parts in 6.3 parts MEK |

To 28.5 parts of the emulsion formulation was added 0.279 parts (5.55 μmol) of substituted olefinic co-developer (CD-1) as a solution of $1.34 \times 10^{-4}$ moles per 6.75 parts methanol. Mixing was continued for another 15 minutes.

Overcoat Formulation:

An overcoat formulation was prepared by mixing the following materials:

| MEK | 290 parts |
| --- | --- |
| PARALOID ® A-21 | 1.85 parts |
| CAB 171-15S | 20.25 parts |
| Vinyl Sulfone VS-1 | 0.96 parts, 80.8% active |
| Benzotriazole | 0.29 parts |
| Acutance Dye AD-1 | 0.56 parts |
| Antifoggant AF-B | 0.51 parts |
| DESMODUR ® N3300 Solution | 1.54 parts, in 0.76 parts MEK |
| Tinting Dye TD-1 | 0.021 parts |

The overcoat formulation was completed by adding the processing latitude stabilizer compound (or a comparative compound) to 14.7 parts of the above solution. These compounds were added as a solid at 1.346 or $2.72 \times 10^{-4}$ moles as indicated in TABLE I. Mixing was continued for another 15 minutes.

Preparation of Photothermographic Materials:

The photothermographic emulsion and overcoat formulations were simultaneously coated onto a 7 mil (178 μm) polyethylene terephthalate support, tinted blue with support dye SD-1. An automated dual knife coater equipped with an in-line dryer was used. Immediately after coating, samples were dried in a forced air oven at 85° C. for 6 minutes. The photothermographic emulsion formulation was coated to obtain a coating weight of between about 1.45 and 1.55 g of total silver/m² (0.0134 to 0.0143 mol/m²). The overcoat formulation was coated to obtain a dry coating weight of about 0.2 g/ft² (2.2 g/m²). The material had an absorbance in the imaging layer of between 1.53 and 1.63 at 815 nm.

The backside of the support had been coated with an antihalation and antistatic layer having an absorbance greater than 0.3 between 805 and 815 nm, and a resistivity of less than $10^{11}$ ohms/square.

Samples of each photothermographic material were cut into strips and imaged with a laser sensitometer at 810 nm. Samples were allowed to equilibrate for 2 hours after exposure but before development. Samples were equilibrated at 68° F. (20° C.) and 80-88% RH (high humidity conditions). Development was carried out under these temperature and humidity conditions.

Samples were then thermally developed to generate continuous tone wedges with image densities varying from a minimum density ($D_{min}$) to a maximum density ($D_{max}$) possible for the exposure source and development conditions. Development was carried out on a 6-inch diameter (15.2 cm) heated rotating drum. The strip contacted the drum for 210 degrees of its revolution, about 11 inches (28 cm). Samples were developed at 122.5° C. for both 15 and 25 seconds in a room maintained at the same conditions under which the samples had been equilibrated.

A strip sample of each photothermographic material was scanned using a computerized densitometer equipped with both a visible filter and a blue filter having peak transmission at about 440 nm.

TABLES I and II show the data for $D_{min}$, $D_{max}$, Speed-2, and Average Contrast (AC-1, AC-2, and AC-3), for samples equilibrated and developed for 15 and 25 seconds under the high humidity conditions noted above. The data in TABLE II also shows the changes in Average Contrast ($\Delta$AC-1, $\Delta$AC-2, and $\Delta$AC-3 among samples developed for 15 and 25 seconds under the same temperature and relative humidity conditions.

These data demonstrate that incorporation of PLS compounds reduces change in AC-1, AC-2 or AC-3 with little change in silver efficiency or Speed-2 when compared with samples containing no PLS compound when the imaged materials were developed for 25 seconds under high humidity conditions. Although Comparative Compound (CC-5) [3,5-dichlorobenzoic acid] when used at the same molar equivalent as the inventive sample also reduced changes in AC-1, AC-2 or AC-3, silver efficiency and Speed-2 were also reduced.

EXAMPLE 2

This example compares photothermographic materials incorporating a processing latitude stabilizer (PLS-3) to similarly prepared materials containing either no processing latitude stabilizer as a control or 2,4,6-trichlorobenzoic acid (CC-3) as a comparative compound. This example shows that photothermographic materials incorporating processing latitude stabilizer (PLS-3) display a smaller increase in average contrast (AC-2, AC-3) particularly at high humidity when compared to similarly prepared photothermographic materials having no processing latitude stabilizer compound.

The procedures for preparation, formulation, and coating of the photothermographic materials are similar to those described in Example 1 except that 0.247 parts (4.91 µmol) of substituted olefinic co-developer (CD-1) was added to the photothermographic emulsion formulation. Processing latitude stabilizer (PLS-3) or comparative compound (CC-3) was added at $2.72 \times 10^{-4}$ moles to the overcoat formulation.

The photothermographic materials were initially equilibrated, imaged, and developed as described in Example 1 under high humidity conditions. A second set of samples were equilibrated and developed at 75° F. (23.9° C.) and 20-24% relative humidity.

TABLE I

| Sample | Comparative/ Inventive | PLS Compound | Amount of PLS Compound ($\times 10^{-4}$ mol) | Development Time (sec.) | Development Conditions (% RH) | Silver Efficiency | $D_{min}$ | $D_{max}$ |
|---|---|---|---|---|---|---|---|---|
| 1-1-C | Control | None | None | 15 sec | 85 | 2.69 | 0.232 | 4.00 |
| 1-2-C | Control | None | None | 25 sec | 85 | 2.74 | 0.252 | 4.19 |
| 1-3-C | Comparative | CC-5 | 1.36 | 15 sec | 85 | 2.65 | 0.228 | 4.03 |
| 1-4-C | Comparative | CC-5 | 1.36 | 25 sec | 85 | 2.67 | 0.245 | 4.13 |
| 1-5-C | Comparative | CC-5 | 2.72 | 15 sec | 85 | 2.42 | 0.224 | 3.60 |
| 1-6-C | Comparative | CC-5 | 2.72 | 25 sec | 85 | 2.52 | 0.228 | 3.80 |
| 1-7-I | Inventive | PLS-1 | 1.36 | 15 sec | 85 | 2.75 | 0.233 | 4.07 |
| 1-8-I | Inventive | PLS-1 | 1.36 | 25 sec | 85 | 2.74 | 0.249 | 4.14 |
| 1-9-I | Inventive | PLS-1 | 2.72 | 15 sec | 85 | 2.56 | 0.230 | 3.72 |
| 1-10-I | Inventive | PLS-1 | 2.72 | 25 sec | 85 | 2.70 | 0.243 | 3.87 |
| 1-11-I | Inventive | PLS-2 | 1.36 | 15 sec | 85 | 2.68 | 0.234 | 3.96 |
| 1-12-I | Inventive | PLS-2 | 1.36 | 25 sec | 85 | 2.71 | 0.260 | 4.18 |
| 1-13-I | Inventive | PLS-2 | 2.72 | 15 sec | 85 | 2.67 | 0.233 | 4.11 |
| 1-14-I | Inventive | PLS-2 | 2.72 | 25 sec | 85 | 2.72 | 0.252 | 4.22 |

TABLE II

| Sample | PLS Compound | Speed-2 | Development Time (sec.) | AC-1 | AC-2 | AC-3 | $\Delta$AC-1 | $\Delta$AC-2 | $\Delta$AC-3 |
|---|---|---|---|---|---|---|---|---|---|
| 1-1-C | None | 2.00 | 15 sec | 4.52 | 4.37 | 4.54 | 3.69 | 5.89 | 8.17 |
| 1-2-C | None | 2.23 | 25 sec | 8.21 | 10.3 | 12.7 | | | |
| 1-3-C | CC-5 | 1.90 | 15 sec | 3.71 | 3.53 | 3.85 | 2.35 | 3.66 | 5.39 |
| 1-4-C | CC-5 | 2.11 | 25 sec | 6.06 | 7.19 | 9.24 | | | |
| 1-5-C | CC-5 | 1.62 | 15 sec | 3.31 | 3.24 | 4.25 | 0.46 | 0.77 | 1.72 |
| 1-6-C | CC-5 | 1.88 | 25 sec | 3.76 | 4.01 | 5.97 | | | |
| 1-7-I | PLS-1 | 1.93 | 15 sec | 3.74 | 3.59 | 3.80 | 3.72 | 5.47 | 6.80 |
| 1-8-I | PLS-1 | 2.21 | 25 sec | 7.45 | 9.06 | 10.6 | | | |
| 1-9-I | PLS-1 | 1.89 | 15 sec | 3.32 | 3.19 | 3.90 | 3.17 | 4.32 | 4.06 |
| 1-10-I | PLS-1 | 2.13 | 25 sec | 6.50 | 7.51 | 7.95 | | | |
| 1-11-I | PLS-2 | 2.03 | 15 sec | 4.22 | 4.00 | 4.61 | 3.93 | 6.12 | 8.24 |
| 1-12-I | PLS-2 | 2.27 | 25 sec | 8.15 | 10.1 | 12.9 | | | |
| 1-13-I | PLS-2 | 2.03 | 15 sec | 4.24 | 4.12 | 4.65 | 3.18 | 4.71 | 5.61 |
| 1-14-I | PLS-2 | 2.24 | 25 sec | 7.42 | 8.83 | 10.3 | | | |

The data, shown b low in TABLES III and IV, demonstrate that photothermographic materials incorporating processing latitude stabilizer (PLS-3) displayed a smaller increase in average contrast (AC-2, AC-3) particularly at high humidity when compared to similarly prepared photothermographic materials having no processing latitude stabilizer compound. In addition, samples incorporating compound (PLS-3) showed little change in the silver efficiency or Speed-2. Although, samples incorporating comparative compound (CC-3) at the same molar equivalent also show d only small increases in AC-1, AC-2, and AC-3, they also showed losses of silver efficiency and Speed-2.

Photothermographic materials were prepared in a manner similar to that described in Example 2. Compounds (CC-1) and (CC-3) ($2.72 \times 10^{-4}$ mol) were added to the overcoat formulation. Control samples were also prepared that contained neither comparative nor processing latitude stabilizer compounds.

The photothermographic materials were equilibrated, exposed, and developed as described in Example 2 under both low and high humidity conditions.

TABLE III

| Sample | Comparative/ Inventive | PLS Compound | Amount of PLS Compound ($\times 10^{-4}$ mol) | Development Time (sec.) | Silver Efficiency | $D_{min}$ | $D_{max}$ |
|---|---|---|---|---|---|---|---|
| Samples Equilibrated and Developed at Low Humidity (23% RH): |||||||| 
| 2-1-C | Control | none | — | 15 sec | 2.32 | 0.240 | 3.57 |
| 2-2-C | Control | none | — | 25 sec | 2.28 | 0.255 | 3.53 |
| 2-3-C | Comparative | CC-3 | 2.72 | 15 sec | 1.99 | 0.235 | 3.16 |
| 2-4-C | Comparative | CC-3 | 2.72 | 25 sec | 1.96 | 0.245 | 3.08 |
| 2-5-I | Inventive | PLS-3 | 2.72 | 15 sec | 2.31 | 0.237 | 3.49 |
| 2-6-I | Inventive | PLS-3 | 2.72 | 25 sec | 2.25 | 0.248 | 3.49 |
| Samples Equilibrated and Developed at High Humidity (82% RH): ||||||||
| 2-7-C | Control | None | — | 15 sec | 2.50 | 0.238 | 4.02 |
| 2-8-C | Control | None | — | 25 sec | 2.59 | 0.257 | 4.01 |
| 2-9-C | Comparative | CC-3 | 2.72 | 15 sec | 2.22 | 0.235 | 3.51 |
| 2-10-C | Comparative | CC-3 | 2.72 | 25 sec | 2.36 | 0.245 | 3.71 |
| 2-11-I | Inventive | PLS-3 | 2.72 | 15 sec | 2.54 | 0.236 | 3.94 |
| 2-12-I | Inventive | PLS-3 | 2.72 | 25 sec | 2.64 | 0.247 | 4.09 |

TABLE IV

| Sample | PLS Compound | Development Time (sec.) | Speed-2 | AC-1 | AC-2 | AC-3 | $\Delta$AC-1 | $\Delta$AC-2 | $\Delta$AC-3 |
|---|---|---|---|---|---|---|---|---|---|
| Samples Equilibrated and Developed at Low Relative Humidity (23% RH): ||||||||||
| 2-1-C | none | 15 sec | 1.71 | 2.87 | 3.10 | 3.59 | 0.39 | 0.89 | 0.49 |
| 2-2-C | none | 25 sec | 1.84 | 3.27 | 3.98 | 4.07 | | | |
| 2-3-C | CC-3 | 15 sec | 1.62 | 2.12 | 2.18 | — | −0.04 | 0.07 | — |
| 2-4-C | CC-3 | 25 sec | 1.70 | 2.08 | 2.25 | | | | |
| 2-5-I | PLS-3 | 15 sec | 1.70 | 2.70 | 3.02 | 3.59 | 0.54 | 0.97 | −0.14 |
| 2-6-I | PLS-3 | 25 sec | 1.81 | 3.25 | 3.98 | 3.45 | | | |
| Samples Equilibrated and Developed at High Relative Humidity (82% RH): ||||||||||
| 2-7-C | None | 15 sec | 1.87 | 3.75 | 3.70 | 4.45 | 1.69 | 2.94 | 2.75 |
| 2-8-C | None | 25 sec | 2.04 | 5.45 | 6.64 | 7.20 | | | |
| 2-9-C | CC-3 | 15 sec | 1.63 | 2.41 | 2.64 | 3.20 | 0.31 | 0.47 | 0.77 |
| 2-10-C | CC-3 | 25 sec | 1.77 | 2.72 | 3.11 | 3.97 | | | |
| 2-11-I | PLS-3 | 15 sec | 1.88 | 3.44 | 3.47 | 4.43 | 1.76 | 2.42 | 2.39 |
| 2-12-I | PLS-3 | 25 sec | 2.05 | 5.19 | 5.89 | 6.82 | | | |

EXAMPLE 3

Comparative

This comparative example demonstrates that photothermographic materials incorporating Comparative Compounds (CC-1) and (CC-3) undergo similar changes in contrast as a comparative sample containing no processing latitude stabilizer compound as a control when the imaged materials are developed for 25 seconds, particularly under the high humidity conditions.

The data, shown below in TABLES V and VI, demonstrate that the use of compounds lacking the "amide hydrogen" give a large increase in contrast after 25 seconds development particularly under conditions of high humidity. These results were similar to control photothermographic materials prepared without incorporating inventive compound. Although addition of the same molar equivalent of 2,4,6-trichlorobenzoic acid (CC-3) reduced changes in Average Contrast at a development time of 25 seconds, silver efficiency and Speed-2 were reduced.

TABLE V

| Sample | Comparative/ Inventive | PLS Compound | Amount of PLS Compound ($\times 10^{-4}$ mol) | Development Time (sec.) | Silver Efficiency | $D_{min}$ | $D_{max}$ |
|---|---|---|---|---|---|---|---|
| Samples Equilibrated and Developed at Low Relative Humidity (23% RH) | | | | | | | |
| 3-1-C | Control | none | — | 15 sec | 2.60 | 0.234 | 3.90 |
| 3-2-C | Control | none | — | 25 sec | 2.60 | 0.253 | 3.83 |
| 3-3-C | Comparative | CC-3 | 2.72 | 15 sec | 2.38 | 0.233 | 3.52 |
| 3-4-C | Comparative | CC-3 | 2.72 | 25 sec | 2.33 | 0.245 | 3.47 |
| 3-5-C | Comparative | CC-1 | 2.72 | 15 sec | 2.58 | 0.232 | 3.52 |
| 3-6-C | Comparative | CC-1 | 2.72 | 25 sec | 2.53 | 0.250 | 3.64 |
| Samples Equilibrated and Developed at High Relative Humidity (85% RH) | | | | | | | |
| 3-7-C | Control | None | — | 15 sec | 2.72 | 0.237 | 4.16 |
| 3-8-C | Control | None | — | 25 sec | 2.75 | 0.271 | 4.10 |
| 3-9-C | Comparative | CC-3 | 2.72 | 15 sec | 2.61 | 0.233 | 3.87 |
| 3-10-C | Comparative | CC-3 | 2.72 | 25 sec | 2.71 | 0.249 | 4.01 |
| 3-11-C | Comparative | CC-1 | 2.72 | 15 sec | 2.67 | 0.237 | 4.01 |
| 3-12-C | Comparative | CC-1 | 2.72 | 25 sec | 2.70 | 0.265 | 4.13 |

TABLE VI

| Sample | PLS Compound | Development Time (sec.) | Speed-2 | AC-1 | AC-2 | AC-3 | $\Delta$AC-1 | $\Delta$AC-2 | $\Delta$AC-3 |
|---|---|---|---|---|---|---|---|---|---|
| Samples Equilibrated and Developed at Low Relative Humidity (23% RH) | | | | | | | | | |
| 3-1-C | none | 15 sec | 1.82 | 3.81 | 3.78 | 5.10 | 1.36 | 2.56 | 2.41 |
| 3-2-C | none | 25 sec | 2.01 | 5.16 | 6.34 | 7.51 | | | |
| 3-3-C | CC-3 | 15 sec | 1.61 | 2.69 | 3.18 | 4.15 | 0.76 | 1.06 | −0.08 |
| 3-4-C | CC-3 | 25 sec | 1.84 | 3.45 | 4.23 | 4.07 | | | |
| 3-5-C | CC-1 | 15 sec | 1.63 | 3.35 | 3.40 | 4.31 | 1.32 | 2.19 | 2.07 |
| 3-6-C | CC-1 | 25 sec | 1.85 | 4.67 | 5.59 | 6.38 | | | |
| Samples Equilibrated and Developed at High Relative Humidity (85% RH) | | | | | | | | | |
| 3-7-C | None | 15 sec | 2.11 | 4.87 | 4.66 | 4.68 | 3.28 | 5.31 | 7.63 |
| 3-8-C | None | 25 sec | 2.29 | 8.15 | 9.96 | 12.3 | | | |
| 3-9-C | CC-3 | 15 sec | 1.81 | 3.28 | 3.55 | 4.71 | 1.94 | 2.83 | 2.23 |
| 3-10-C | CC-3 | 25 sec | 2.01 | 5.21 | 6.38 | 6.94 | | | |
| 3-11-C | CC-1 | 15 sec | 1.91 | 4.17 | 4.05 | 4.24 | 3.97 | 5.84 | 7.53 |
| 3-12-C | CC-1 | 25 sec | 2.13 | 8.13 | 9.90 | 11.8 | | | |

EXAMPLE 4

Comparative

This comparative example demonstrates that photothermographic materials incorporating Comparative Compounds (CC-2) and (CC-4) undergo similar changes in contrast as a comparative sample containing no processing latitude stabilizer compound the imaged materials are developed for 25 seconds.

Photothermographic materials were prepared, coated, and dried in a manner similar to that described in Example 1 except 0.263 parts (5.23 μmoles) of substituted olefinic co-developer (CD-1) was added to the photothermographic emulsion and the formulation was coated to obtain a coating weight of between about 1.50 and 1.55 g of total silver/m² (0.0138 to 0.0148 mol/m²). The overcoat formulation was coated to obtain about a dry coating weight of about 0.2 g/ft² (2.2 g/m²). Compounds (CC-2) arLd (CC-4) were added at 1.36 or 2.72×10⁻⁴ moles to the overcoat formulation. The material had an absorbance in the imaging layer of between 1.55 and 1.65 at 815 nm.

The photothermographic materials were equilibrated, exposed, and developed as described in Example 2 under both low or high humidity conditions as described in Example 2.

The data, shown below in TABLES VII and VIII, demonstrate that incorporation of (CC-2) gave an increase in contrast after 25 seconds development at low or high humidity similar to that of photothermographic materials prepared without incorporating any comparative compound. At the same molar equivalence, the addition of benzoic acid (CC-4) increased average contrast at 25 seconds development time at both low and high humidity similar or greater than the coating without any comparative compound. Silver efficiency and Speed-2 also were similar to materials prepared without any comparative or inventive compounds.

TABLE VII

| Sample | Comparative/ Inventive | PLS Compound | Amount of PLS Compound ($\times 10^{-4}$ mol) | Development Time (sec.) | Silver Efficiency | $D_{min}$ | $D_{max}$ |
|---|---|---|---|---|---|---|---|
| Samples Equilibrated and Developed at Low Relative Humidity (24% RH) ||||||||
| 4-1-C | Control | None | — | 15 sec | 2.52 | 0.238 | 3.93 |
| 4-2-C | Control | None | — | 25 sec | 2.45 | 0.258 | 3.78 |
| 4-3-C | Comparative | CC-4 | 1.36 | 15 sec | 2.52 | 0.235 | 4.00 |
| 4-4-C | Comparative | CC-4 | 1.36 | 25 sec | 2.55 | 0.256 | 4.00 |
| 4-5-C | Comparative | CC-4 | 2.72 | 15 sec | 2.58 | 0.235 | 3.92 |
| 4-6-C | Comparative | CC-4 | 2.72 | 25 sec | 2.52 | 0.252 | 3.63 |
| 4-7-C | Comparative | CC-2 | 1.36 | 15 sec | 2.54 | 0.234 | 3.84 |
| 4-8-C | Comparative | CC-2 | 1.36 | 25 sec | 2.47 | 0.249 | 3.69 |
| 4-9-C | Comparative | CC-2 | 2.72 | 15 sec | 2.47 | 0.231 | 3.74 |
| 4-10-C | Comparative | CC-2 | 2.72 | 25 sec | 2.46 | 0.248 | 3.74 |
| Samples Equilibrated and Developed at High Relative Humidity (86% RH) ||||||||
| 4-11-C | Control | None | — | 15 sec | 2.68 | 0.239 | 4.13 |
| 4-12-C | Control | None | — | 25 sec | 2.67 | 0.263 | 4.20 |
| 4-13-C | Comparative | CC-4 | 1.36 | 15 sec | 2.78 | 0.236 | 4.17 |
| 4-14-C | Comparative | CC-4 | 1.36 | 25 sec | 2.73 | 0.268 | 4.31 |
| 4-15-C | Comparative | CC-4 | 2.72 | 15 sec | 2.70 | 0.234 | 3.94 |
| 4-16-C | Comparative | CC-4 | 2.72 | 25 sec | 2.71 | 0.269 | 4.25 |
| 4-17-C | Comparative | CC-2 | 1.36 | 15 sec | 2.65 | 0.235 | 4.02 |
| 4-18-C | Comparative | CC-2 | 1.36 | 25 sec | 2.72 | 0.256 | 4.13 |
| 4-19-C | Comparative | CC-2 | 2.72 | 15 sec | 2.62 | 0.233 | 4.04 |
| 4-20-C | Comparative | CC-2 | 2.72 | 25 sec | 2.61 | 0.255 | 4.12 |

TABLE VIII

| Sample | PLS Compound | Development Time (sec.) | Speed-2 | AC-1 | AC-2 | AC-3 | $\Delta$AC-1 | $\Delta$AC-2 | $\Delta$AC-3 |
|---|---|---|---|---|---|---|---|---|---|
| Samples Equilibrated and Developed at Low Relative Humidity (24% RH) ||||||||||
| 4-1-C | none | 15 sec | 1.87 | 3.64 | 3.70 | 4.60 | 0.83 | 1.84 | 1.85 |
| 4-2-C | none | 25 sec | 1.97 | 4.48 | 5.54 | 6.45 | | | |
| 4-3-C | CC-4 | 15 sec | 1.87 | 4.00 | 3.97 | 4.55 | 1.23 | 2.05 | 2.00 |
| 4-4-C | CC-4 | 25 sec | 2.06 | 5.23 | 6.02 | 6.54 | | | |
| 4-5-C | CC-4 | 15 sec | 1.85 | 3.74 | 3.84 | 4.57 | 1.09 | 1.76 | 1.06 |
| 4-6-C | CC-4 | 25 sec | 2.03 | 4.82 | 5.61 | 5.63 | | | |
| 4-7-C | CC-2 | 15 sec | 1.80 | 3.43 | 3.42 | 4.30 | 1.15 | 2.17 | 1.72 |
| 4-8-C | CC-2 | 25 sec | 1.98 | 4.58 | 5.59 | 6.02 | | | |
| 4-9-C | CC-2 | 15 sec | 1.81 | 3.60 | 3.65 | 4.65 | 1.03 | 2.08 | 2.01 |
| 4-10-C | CC-2 | 25 sec | 1.96 | 4.63 | 5.73 | 6.66 | | | |
| Samples Equilibrated and Developed at High Relative Humidity (86% RH) ||||||||||
| 4-11-C | None | 15 sec | 1.99 | 4.13 | 4.05 | 4.90 | 3.19 | 5.18 | 5.76 |
| 4-12-C | None | 25 sec | 2.20 | 7.31 | 9.23 | 10.7 | | | |
| 4-13-C | 4-1-C | 15 sec | 2.04 | 4.69 | 4.48 | 5.02 | 3.57 | 5.97 | 8.92 |
| 4-14-C | 4-1-C | 25 sec | 2.30 | 8.26 | 10.4 | 13.9 | | | |
| 4-15-C | 4-1-C | 15 sec | 2.02 | 4.33 | 4.24 | 4.68 | 3.77 | 6.17 | 8.00 |
| 4-16-C | 4-1-C | 25 sec | 2.30 | 8.10 | 10.4 | 12.7 | | | |
| 4-17-C | CC-2 | 15 sec | 1.97 | 3.84 | 3.77 | 4.30 | 3.93 | 5.87 | 6.24 |
| 4-18-C | CC-2 | 25 sec | 2.21 | 7.77 | 9.64 | 10.5 | | | |
| 4-19-C | CC-2 | 15 sec | 1.97 | 4.03 | 4.00 | 4.80 | 3.05 | 4.63 | 4.70 |
| 4-20-C | CC-2 | 25 sec | 2.19 | 7.07 | 8.62 | 9.50 | | | |

EXAMPLE 5

This example demonstrates that compounds (PLS-1), (PLS-6), and (PLS-9) reduce changes in average contrast with little effect on silver efficiency or Speed-2 when compared with photothermographic materials containing no additive or comparative additive (CC-5) when the imaged materials were developed for 25 seconds, especially under high humidity conditions.

Photothermographic formulations and materials were prepared in a manner similar to that described in Example 1 except that 0.263 parts (5.23 μmoles) of substituted olefinic co-developer (CD-1) was added to the photothermographic emulsion. The formulation was coated to obtain a coating weight of between about 1.50 and 1.60 g of total silver/m$^2$ (0.0138 to 0.0148 mol/m$^2$). The overcoat formulation was coated to obtain about a dry coating weight of about 0.2 g/ft$^2$ (2.2 g/m$^2$). The absorbance in the imaging layer was between 1.61 and 1.71 at 815 nm. Inventive compounds (PLS-1), (PLS-6), and (PLS-9), and 3,5-dichlorobenzoic acid (CC-5) were added at $1.36 \times 10^{-4}$ moles to the overcoat formulation.

The photothermographic materials were initially exposed and developed as described in Example 2. These samples were then imaged and exposed in both low or high humidity conditions as described in Example 2.

As can be seen by TABLES IX and X below, use of the inventive compounds provided a smaller increase in contrast after 25 second development particularly at high humidity as compared to the coating without any additive. Although, addition of the same molar equivalent of 3,5-dichlorobenzoic acid (CC-5) decreased changes in contrast at 25 second development at both low and high humidity, it also decreased the silver efficiency and Speed-2.

Pat. No. 5,939,249 (noted above). The core-shell silver halide emulsion had a silver iodobromide core with 8% iodide, and a silver bromide shell doped with iridium and copper. The core made up 25% of each silver halide grain, and the shell made up the remaining 75%. The silver halide grains were cubic in shape, and had a mean grain size between 0.055 and 0.06 μm. The preformed silver halide, silver carboxylate soap dispersion was made by mixing 26.1% preformed silver

TABLE IX

| Sample | Comparative/ Inventive | PLS Compound | Amount of PLS Compound ($\times 10^{-4}$ mol) | Development Time (sec.) | Silver Efficiency | $D_{min}$ | $D_{max}$ |
|---|---|---|---|---|---|---|---|
| Samples Equilibrated and Developed at Low Relative Humidity (23% RH) | | | | | | | |
| 5-1-C | Control | none | — | 15 sec | 2.27 | 0.245 | 3.43 |
| 5-2-C | Control | none | — | 25 sec | 2.27 | 0.266 | 3.36 |
| 5-3-C | Comparative | CC-5 | 1.36 | 15 sec | 2.12 | 0.239 | 3.28 |
| 5-4-C | Comparative | CC-5 | 1.36 | 25 sec | 2.19 | 0.258 | 3.26 |
| 5-5-I | Inventive | PLS-1 | 1.36 | 15 sec | 2.31 | 0.242 | 3.46 |
| 5-6-I | Inventive | PLS-1 | 1.36 | 25 sec | 2.24 | 0.258 | 3.29 |
| 5-7-I | Inventive | PLS-6 | 1.36 | 15 sec | 2.23 | 0.243 | 3.44 |
| 5-8-I | Inventive | PLS-6 | 1.36 | 25 sec | 2.23 | 0.264 | 3.43 |
| 5-9-I | Inventive | PLS-9 | 1.36 | 15 sec | 2.25 | 0.241 | 3.45 |
| 5-10-I | Inventive | PLS-9 | 1.36 | 25 sec | 2.22 | 0.258 | 3.35 |
| Samples Equilibrated and Developed at High Relative Humidity (85% RH) | | | | | | | |
| 5-11-C | Control | None | — | 15 sec | 2.61 | 0.242 | 3.95 |
| 5-12-C | Control | None | — | 25 sec | 2.58 | 0.265 | 3.89 |
| 5-13-C | Comparative | CC-5 | 1.36 | 15 sec | 2.47 | 0.240 | 3.77 |
| 5-14-C | Comparative | CC-5 | 1.36 | 25 sec | 2.38 | 0.260 | 3.78 |
| 5-15-I | Inventive | PLS-1 | 1.36 | 15 sec | 2.61 | 0.242 | 3.96 |
| 5-16-I | Inventive | PLS-1 | 1.36 | 25 sec | 2.57 | 0.262 | 3.86 |
| 5-17-I | Inventive | PLS-6 | 1.36 | 15 sec | 2.55 | 0.239 | 4.03 |
| 5-18-I | Inventive | PLS-6 | 1.36 | 25 sec | 2.53 | 0.262 | 3.92 |
| 5-19-I | Inventive | PLS-9 | 1.36 | 15 sec | 2.52 | 0.239 | 3.85 |
| 5-20-I | Inventive | PLS-9 | 1.36 | 25 sec | 2.54 | 0.258 | 3.94 |

TABLE X

| Sample | PLS Compound | Development Time (sec.) | Speed-2 | AC-1 | AC-2 | AC-3 | Δ AC-1 | Δ AC-2 | Δ AC-3 |
|---|---|---|---|---|---|---|---|---|---|
| Samples Equilibrated and Developed at Low Relative Humidity (23% RH) | | | | | | | | | |
| 5-1-C | none | 15 sec | 1.75 | 2.89 | 3.25 | 3.67 | 0.81 | 1.42 | −1.39 |
| 5-2-C | none | 25 sec | 1.89 | 3.70 | 4.67 | 2.28 | | | |
| 5-3-C | CC-5 | 15 sec | 1.63 | 2.28 | 2.47 | 2.44 | 0.15 | 0.48 | −1.02 |
| 5-4-C | CC-5 | 25 sec | 1.74 | 2.42 | 2.95 | 1.42 | | | |
| 5-5-I | PLS-1 | 15 sec | 1.71 | 2.27 | 3.14 | 3.28 | 0.81 | 1.22 | −1.47 |
| 5-6-I | PLS-1 | 25 sec | 1.83 | 3.53 | 4.36 | 1.81 | | | |
| 5-7-I | PLS-6 | 15 sec | 1.67 | 2.45 | 2.75 | 3.05 | 0.85 | 1.13 | 0.01 |
| 5-8-I | PLS-6 | 25 sec | 1.84 | 3.30 | 3.88 | 3.06 | | | |
| 5-9-I | PLS-9 | 15 sec | 1.67 | 2.43 | 2.76 | 3.06 | 0.60 | 0.94 | −1.39 |
| 5-10-I | PLS-9 | 25 sec | 1.78 | 3.03 | 3.70 | 1.67 | | | |
| Samples Equilibrated and Developed at High Relative Humidity (85% RH) | | | | | | | | | |
| 5-11-C | none | 15 sec | 1.93 | 3.46 | 3.70 | 4.48 | 2.69 | 3.92 | 3.25 |
| 5-12-C | none | 25 sec | 2.09 | 6.14 | 7.62 | 7.73 | | | |
| 5-13-C | CC-5 | 15 sec | 1.77 | 2.98 | 3.09 | 4.17 | 0.59 | 1.27 | 0.61 |
| 5-14-C | CC-5 | 25 sec | 1.93 | 3.57 | 4.36 | 4.78 | | | |
| 5-15-I | PLS-1 | 15 sec | 1.91 | 3.64 | 3.71 | 4.54 | 1.43 | 2.46 | 2.13 |
| 5-16-I | PLS-1 | 25 sec | 1.98 | 5.07 | 6.18 | 6.66 | | | |
| 5-17-I | PLS-6 | 15 sec | 1.93 | 3.58 | 3.50 | 4.15 | 1.48 | 2.52 | 1.96 |
| 5-18-I | PLS-6 | 25 sec | 2.00 | 5.06 | 6.02 | 6.11 | | | |
| 5-19-I | PLS-9 | 15 sec | 1.85 | 3.17 | 3.24 | 3.94 | 2.08 | 3.08 | 2.85 |
| 5-20-I | PLS-9 | 25 sec | 2.03 | 5.25 | 6.31 | 6.79 | | | |

EXAMPLE 6

Preparation of Photothermographic Emulsion Formulation

A preformed silver halide, silver carboxylate soap dispersion, was prepared in fashion similar to that described in U.S. halide, silver carboxylate soap, 2.1% PIOLOFORM® BM-18 polyvinyl butyral binder, and 71.8% MEK, and homogenizing three times at 8000 psi (55 MPa).

A photothermographic emulsion formulation was prepared at 67° F. (19.4° C.) containing 174 parts of the above preformed silver halide, silver carboxylate soap dispersion and 22 parts of MEK. To this formulation was added 1.6 parts of a 15% solution of pyridinium hydrobromide perbromide in methanol, with stirring. After 45 minutes of mixing, 2.1 parts of an 11% zinc bromide solution in methanol was added. Stirring was continued and after 30 minutes, a solution of 0.18 parts 2-mercapto-5-methylbenzimidazole, 0.009 parts of Sensitizing Dye A, 2.0 parts of 2-(4-chlorobenzoyl)benzoic acid, 10.8 parts of methanol, and 3.4 parts of MEK were added. After stirring for 75 minutes, the temperature was lowered to 50° F. (10° C.), and 37.6 parts of PIOLOFORM® BM-18, 21.2 parts of PIOLOFORM® BL-16, and 10 parts of MEK were added. Mixing was continued for another 15 minutes.

The emulsion formulation was completed by adding the materials shown below. Five minutes were allowed between the additions of each component.

| Solution A containing: | |
|---|---|
| Antifoggant AF-A | 0.80 parts |
| Tetrachlorophthalic acid (TCPA) | 0.37 parts |
| 4-Methylphthalic acid (4-MPA) | 1.21 parts |
| MEK | 21 parts |
| Methanol | 0.36 parts |
| Developer-1 (TP-1) | 7.18 parts |
| Developer-2 (DEV-2) | 0.54 parts |
| DESMODUR ® N3300 Solution | 0.66 parts in 0.33 parts MEK |
| Phthalazine (PHZ) | 1.42 parts in 6.3 parts MEK |

To 30 parts of the completed emulsion formulation was added 0.0065 mmol of co-developers and the amount of processing latitude stabilizer as shown in TABLE XI, in 1.30 parts methanol. The resulting solution was mixed for 10 minutes and was ready for (coating.

Overcoat Formulation:

Overcoat formulations were prepared by mixing the following materials:

| MEK | 166 parts |
|---|---|
| PARALOID ® A-21 | 1.06 parts |
| CAB 171-15S | 11.52 parts |
| Vinyl Sulfone VS-1 | 0.59 parts, 75% active |
| Benzotriazole (BZT) | 0.165 parts |
| Acutance Dye AD-1 | 0.32 parts |
| Antifoggant AF-B | 0.29 parts |
| DESMODUR ® N3300 Solution | 0.89 parts, in 0.41 parts MEK |
| Tinting Dye TD-1 | 0.012 parts |
| Processing Latitude Stabilizer | see TABLE XI |

Preparation of Photothermographic Materials:

The photothermographic emulsion and overcoat formulations were simultaneously coated onto a 7 mL (178 μm) polyethylene terephthalate support, tinted blue with support dye SD-1. An automated dual knife coater was used. Immediately after coating, samples were dried in a forced air oven at 85° C. for 6 minutes. The photothermographic emulsion formulation was coated to obtain a coating weight of between about 1.5 and 1.55 g of total silver/m$^2$ (between about 0.0139 and 0.0144 mol/m$^2$). The (overcoat formulation was coated to obtain a dry coating weight of about 0.2 g/ft$^2$ (2.2 g/m$^2$). The absorbance in the imaging layer was between 1.5 and 1.6 at 815 nm.

The backside of the support had been coated with an antihalation and antistatic layer having an absorbance greater than 0.3 between 805 and 815 nm, and a resistivity of less than $10^{11}$ ohms/square.

Samples of each photothermographic material were cut into strips and imaged with a laser sensitometer at 810 nm. Samples were allowed to equilibrate for 2 hours at 68° F. (20° C.) and 85% RH (high humidity conditions) after exposure but before development. Development was carried out under these temperature and humidity conditions.

Samples were then thermally developed to generate continuous tone wedges as described in Example 1

Evaluation of Photothermographic Materials:

As noted above, processing latitude stabilizers were evaluated by adding through either the overcoat layer or the photothermographic emulsion layer at various concentrations. TABLE: XII shows the sensitometric data for $D_{min}$, Speed-2, $D_{max}$, and Average Contrast-1 and -3 (AC-1 and AC-3) for samples equilibrated and developed under high humidity condition (85% RH) for 15 and 25 seconds. Sample processing latitude was determined by taking the difference between the sensitometric data of identically prepared samples developed at these two temperatures. The changes in these values are recorded in TABLE XIII.

The data, shown below in TABLES XII and XIII, demonstrate that incorporation of processing latitude stabilizers (PLS 1), (PLS-11), and (PLS-14) provide photothermographic materials with excellent processing latitude stability. In contrast, samples not containing, these processing latitude stabilizers displayed large variation in Speed-2 and Average Contrast-3.

TABLE XI

| Sample | Comparative/ Inventive | Co-Developer | PLS Compound | Amount of PLS Compound (mg/m$^2$) | Location of PLS Compound |
|---|---|---|---|---|---|
| 6-1-C | Control | CD-2 | None | 0 | — |
| 6-2-I | Invention | CD-2 | PLS-14 | 104 | Topcoat |
| 6-3-I | Invention | CD-2 | PLS-14 | 173 | Topcoat |
| 6-4-I | Invention | CD-2 | PLS-11 | 104 | Topcoat |
| 6-5-I | Invention | CD-2 | PLS-11 | 173 | Topcoat |
| 6-6-I | Invention | CD-2 | PLS-1 | 104 | Topcoat |
| 6-7-I | Invention | CD-2 | PLS-1 | 173 | Topcoat |
| 6-8-C | Control | CD-3 | None | 0 | — |
| 6-8-I | Invention | CD-3 | PLS-1 | 173 | Topcoat |
| 6-10-I | Invention | CD-3 | PLS-1 | 104 | Ag |
| 6-11-C | Control | CD-3 | None | 0 | — |
| 6-12-I | Invention | CD-3 | PLS-1 | 173 | Topcoat |
| 6-13-I | Invention | CD-3 | PLS-1 | 104 | Ag |

TABLE XII

| | | Sensitometry of Samples Developed for 15 sec at 122.5° C. and 85% RH | | | | | Sensitometry of Samples Developed for 25 sec at 122.5° C. and 85% RH | | | | |
|---|---|---|---|---|---|---|---|---|---|---|---|
| Sample | PLS Cpd. | $D_{min}$ | $D_{max}$ | Speed-2 | AC-1 | AC-3 | $D_{min}$ | $D_{max}$ | Spd-2 | AC-1 | AC-3 |
| 6-1-C | None | 0.232 | 3.969 | 2.042 | 4.014 | 4.003 | 0.254 | 4.159 | 2/435 | 6.473 | 9.915 |
| 6-2-I | PLS-14 | 0.231 | 4.032 | 1.992 | 3.884 | 4.145 | 0.252 | 3.970 | 2.196 | 6.042 | 7.414 |
| 6-3-I | PLS-14 | 0.229 | 3.951 | 1.889 | 3.751 | 3.755 | 0.242 | 4.114 | 2.168 | 6.185 | 8.573 |
| 6-4-I | PLS-11 | 0.232 | 3.954 | 1.809 | 3.446 | 3.678 | 0.239 | 4.067 | 2.058 | 5.483 | 6.183 |
| 6-5-I | PLS-11 | 0.230 | 3.957 | 1.731 | 3.323 | 3.807 | 0.237 | 3.872 | 1.903 | 4.337 | 5.588 |
| 6-6-I | PLS-1 | 0.228 | 3.729 | 1.914 | 3.801 | 4.238 | 0.238 | 3.800 | 2.149 | 5.746 | 7.578 |
| 6-7-I | PLS-1 | 0.233 | 3.784 | 1.871 | 3.072 | 3.659 | 0.241 | 3.840 | 2.107 | 4.827 | 5.447 |
| 6-8-C | None | 0.233 | 4.065 | 2.041 | 4.139 | 4.193 | 0.246 | 4.047 | 2.361 | 6.602 | 9.728 |
| 6-8-I | PLS-1 | 0.232 | 3.814 | 1.849 | 3.309 | 3.880 | 0.238 | 3.874 | 2.117 | 4.993 | 6.315 |
| 6-10-I | PLS-1 | 0.230 | 3.952 | 1.915 | 3.892 | 4.250 | 0.242 | 4.079 | 2.222 | 5.975 | 7.518 |
| 6-11-C | None | 0.233 | 4.065 | 2.041 | 4.139 | 4.193 | 0.246 | 4.047 | 2.361 | 6.602 | 9.728 |
| 6-12-I | PLS-1 | 0.230 | 3.804 | 1.915 | 3.459 | 4.118 | 0.239 | 3.975 | 2.168 | 5.609 | 7.266 |
| 6-13-I | PLS-1 | 0.228 | 3.774 | 1.860 | 3.408 | 4.003 | 0.241 | 3.999 | 2.194 | 6.098 | 7.710 |

TABLE XII

| | | Change in Sensitometry | | | | |
|---|---|---|---|---|---|---|
| Sample | PLS Cpd. | Δ $D_{min}$ | Δ $D_{max}$ | Δ Spd-2 | Δ AC-1 | Δ AC-3 |
| 6-1-C | None | 0.022 | 0.191 | 0.393 | 2.459 | 5.192 |
| 6-2-I | PLS-14 | 0.011 | −0.062 | 0.204 | 2.158 | 3.270 |
| 6-3-I | PLS-14 | 0.013 | 0.163 | 0.279 | 2.433 | 4.818 |
| 6-4-I | PLS-11 | 0.008 | 0.113 | 0.249 | 2.037 | 2.505 |
| 6-5-I | PLS-11 | 0.007 | −0.085 | 0.172 | 1.014 | 1.780 |
| 6-6-I | PLS-1 | 0.010 | 0.071 | 0.235 | 1.945 | 3.340 |
| 6-7-I | PLS-1 | 0.008 | 0.055 | 0.236 | 1.755 | 1.788 |
| 6-8-C | None | 0.013 | −0.018 | 0.321 | 2.463 | 5.535 |
| 6-8-I | PLS-1 | 0.006 | 0.060 | 0.268 | 1.684 | 2.435 |
| 6-10-I | PLS-1 | 0.012 | 0.127 | 0.306 | 2.083 | 3.268 |
| 6-11-C | None | 0.013 | −0.018 | 0.321 | 2.463 | 5.535 |
| 6-12-I | PLS-1 | 0.009 | 0.171 | 0.253 | 2.149 | 3.147 |
| 6-13-I | PLS-1 | 0.012 | 0.224 | 0.335 | 2.690 | 3.707 |

The invention has been described in detail with particular reference to certain preferred embodiments hereof, but it will be understood that variations and modifications can be effected within the spirit and scope of the invention.

The invention claimed is:

1. A black-and-white photothermographic material comprising a support having on at least one side thereof, one or more photothermographic emulsion layers comprising in reactive association:
   a. a photosensitive silver halide,
   b. a non-photosensitive source of reducible silver ions,
   c. a reducing agent composition for the reducible silver ions,
   d. a polymeric binder,
   e. one or more processing latitude stabilizers represented by Structures (I) or (II),

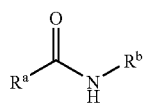

(I)

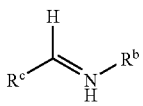

(II)

wherein $R^a$ represents a substituted or unsubstituted alkyl, cycloalkyl, alkenyl, cycloalkenyl, heterocyclic, aromatic, or heteroaromatic group, wherein $R^b$ represents an aromatic carboxylate group whose corresponding acid has a pKa less than about 3, wherein $R^c$ represents a substituted or unsubstituted alkyl, cycloalkyl, alkenyl, cycloalkenyl, heterocyclic, aromatic, or heteroaromatic group, and f. a substituted olefin c co-developer.

2. The photothermographic material of claim 1 wherein $R^a$ represents a substituted or unsubstituted alkyl or cycloalkyl group of 1 to 20 carbon atoms, or a substituted or unsubstituted aromatic group of 6 to 10 carbon atoms, $R^b$ represents a substituted phenyl or naphthyl carboxyl group whose corresponding acid has a pKa less than about 3, and $R^c$ represents a substituted or unsubstituted aromatic group of 6 to 10 carbon atoms.

3. The photothermographic material of claim 1 wherein $R^a$ represents a substituted or unsubstituted alkyl or cycloalkyl group of 1 to 10 carbon atoms, or a substituted or unsubstituted phenyl or naphthyl group, $R^b$ represents a phenylcarboxyl substituted with more than one fluoro, chloro, or nitro groups, or combinations thereof, and $R^c$ represents alkoxy substituted phenyl or naphthyl group wherein the alkoxy group has 1 to 6 carbon atoms.

4. The photothermographic material of claim 1 wherein said processing latitude stabilizer is represented by one or more of the following compounds (PLS-1) to (PLS-18).

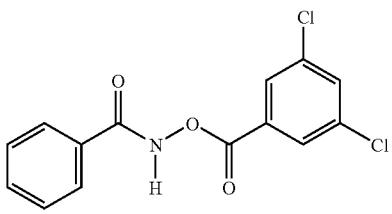

(PLS-1)

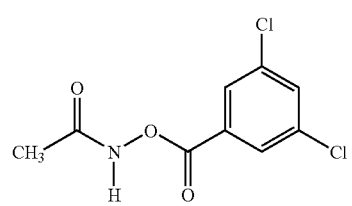

(PLS-2)

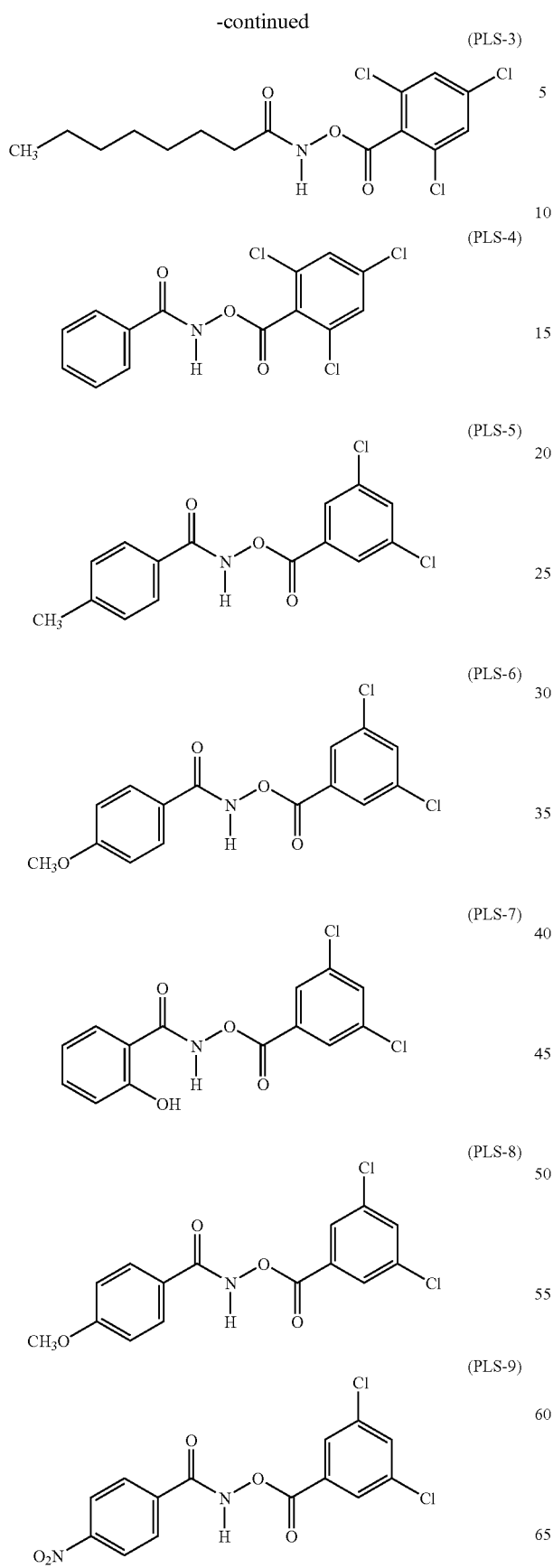
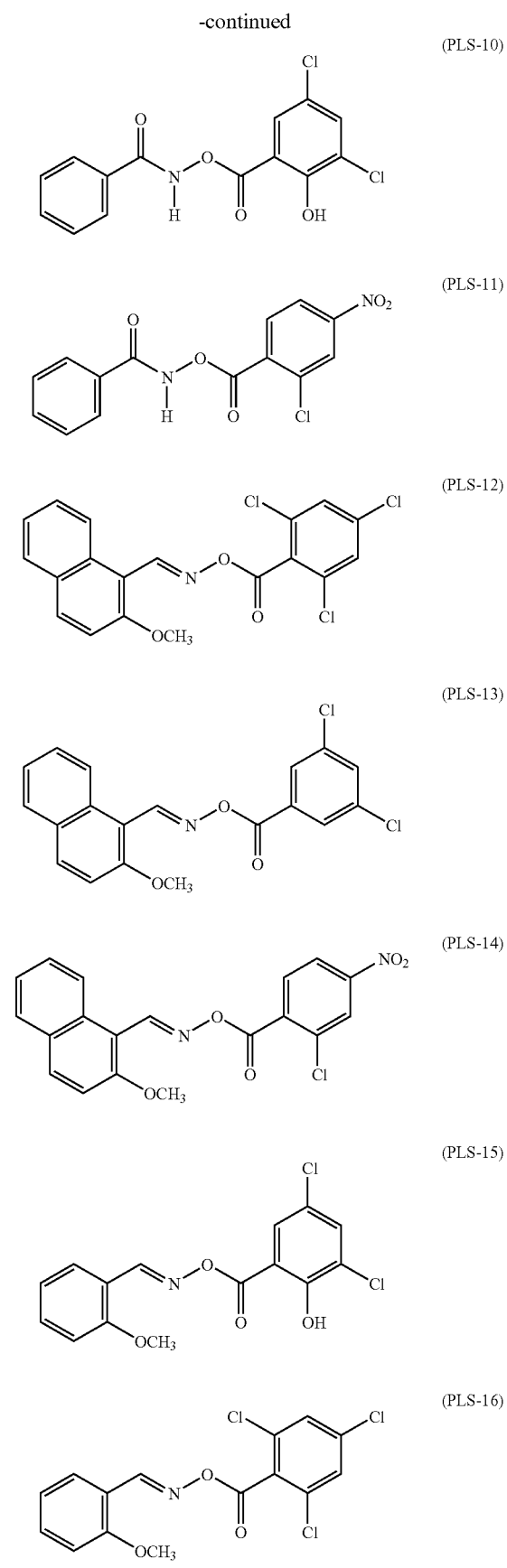

-continued

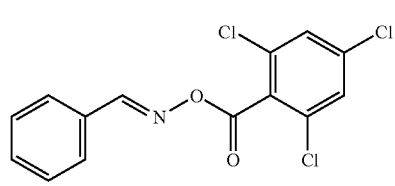
(PLS-17)

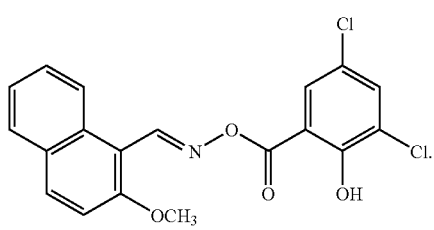
(PLS-18)

5. The photothermographic material of claim 1 wherein said reducing agent composition comprises a hindered phenol, a hindered bis-phenol, a hindered tris-phenol, or combinations thereof.

6. The photothermographic material of claim 5 wherein said tris-phenol reducing agent is represented by the following Structure (III):

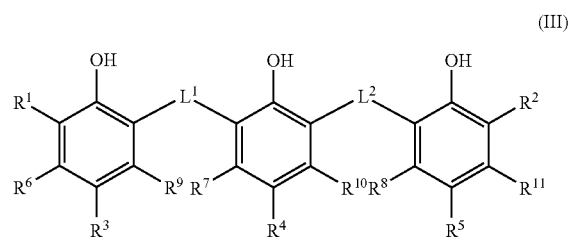
(III)

wherein $L^1$ and $L^2$ are independently sulfur or a mono-substituted or unsubstituted methylene groups, $R^1$ and $R^2$ are independently primary or secondary substituted or unsubstituted alkyl groups having 1 to 12 carbon atoms, $R^3$, $R^4$, and $R^5$ are independently substituted or unsubstituted alkyl groups having 1 to 12 carbon atoms, substituted or unsubstituted alkoxy groups having 1 to 12 carbon atoms, or halo groups, and $R^6$, $R^7$, $R^8$, $R^9$, $R^{10}$, and $R^{11}$ are independently hydrogen or any substituent that is substitutable on a benzene ring.

7. The photothermographic material of claim 1 wherein said co-developer is a substituted olefinic co-developer is represented by the following Structure (IV):

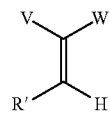
(IV)

wherein V and W are independently aromatic groups or electron withdrawing groups, provided that at least one of V and W is an electron withdrawing group, or V and W can represent the atoms necessary to form a ring containing an electron withdrawing group, and R' is halo, hydroxyl, thiohydrocarbyl, oxyhydrocarbyl, HET, —$O^-A^+$, or —$S^-A^+$ group, wherein HET represents a 5- or 6-membered heteroaromatic group attached through a non-quaternary nitrogen atom, and $A^+$ represents a cation of an alkali metal, quaternary ammonium, quaternary phosphonium, ternary sulfonium, or a complex cation of an alkali metal cation with a CROWN ETHER.

8. The photothermographic material of claim 7 wherein R' is hydroxyl, acyloxy, or —$O^-A^+$.

9. The photothermographic material of claim 1 wherein said one or more processing latitude stabilizers represented by Structures (I) or (II), is present in an amount of from about 0.5 to about 1% (dry weight) of the emulsion layer.

10. The photothermographic material of claim 1 wherein said one or more processing latitude stabilizers represented by Structures (I) or (II), is present in an amount of at least 0.10 mmol/m$^2$.

11. The photothermographic material of claim 1 wherein said one or more processing latitude stabilizers represented by Structures (I) or (II), is present in a total amount of from about 0.30 mmol/m$^2$ to about 0.60 mmol/m$^2$ in one or more layers on an imaging side of the support.

12. The photothermographic material of claim 1 wherein the molar ratio said of processing latitude stabilizer represented by Structures (I) or (II) to said reducing agent is generally present in a total amount of from about 0.03:1 to about 0.30:1.

13. The photothermographic material of claim 1 further comprising a contrast enhancing agent.

14. The photothermographic material of claim 13 wherein said contrast enhancing agent is a hydroxylamine, alkanolamine, ammonium phthalamate, hydroxamic acid, N-acylhydrazine, or hydrogen atom donor compound.

15. A black-and-white photothermographic material comprising a support having on at least one side thereof, one or more photothermographic emulsion layers comprising in reactive association:

a. a photosensitive silver halide that is silver bromide or silver iodobromide that is present predominantly in cubic or tabular grains, b. a non-photosensitive source of reducible silver ions comprising at least silver behenate, c. a reducing agent is one or more of tris-phenol reducing agents represented by Structures (TP-1) or (TP-2) that is present in an amount of from about 1 to about 5 mmol/m$^2$,

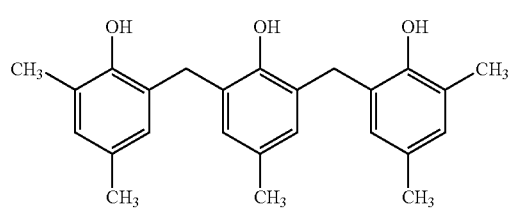
(TP-1)

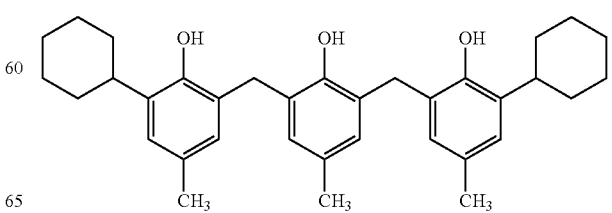
(TP-2)

d. a polymeric binder is a polyvinyl butyral or polyvinyl acetal, and e. one or more processing latitude stabilizers represented by Structures (I) or (II),

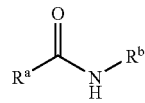
(I)

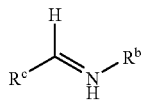
(II)

wherein $R^a$ represents a substituted or unsubstituted alkyl or cycloalkyl group of 1 to 10 carbon atoms, or a substituted or unsubstituted phenyl or naphthyl group, $R^b$ represents 2,4-dichlorophenylcarboxyl, 1,3,5-trichlorophenylcarboxyl, or 2-chloro-4-nitrophenylcarboxyl group, $R^c$ represents an alkoxy substituted phenyl or naphthyl group wherein the alkoxy group has 1 to 6 carbon atoms, and f. a substituted olefinic co-developer represented by the following Structure (IV):

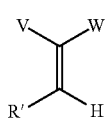
(IV)

wherein V and W are independently aromatic groups or electron withdrawing groups, provided that at least one of V and W is an electron withdrawing group having a Hammett $\sigma_p$ greater than 0.35, or V and W can represent the atoms necessary to form a ring containing such an electron withdrawing group, and R' is hydroxyl, acyloxy, or, $-O^-A^+$, and wherein the total amount of silver is present in an amount of at least 1 g/m² and less than or equal to 2.6 g/m².

16. The photothermographic material of claim 15 further comprising a substituted olefinic co-developer is one or more of compounds (CD-1) to (CD-15), said substituted olefinic co-developer that is present in an amount of from about 0.005 to about 0.02 mmol/m², and the molar ratio of said substituted olefinic co-developer to said tris-phenol reducing agent is from about 0.001:1 to about 0.02:1.

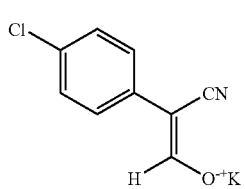
(CD-1)

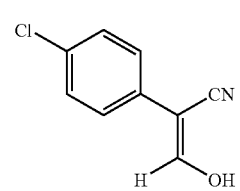
(CD-2)

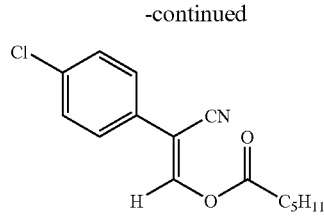
(CD-3)

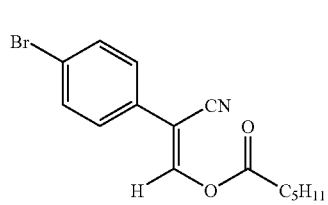
(CD-4)

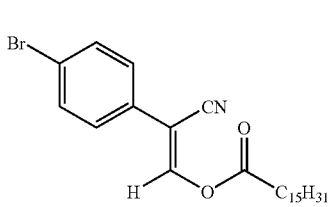
(CD-5)

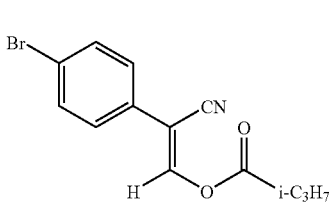
(CD-6)

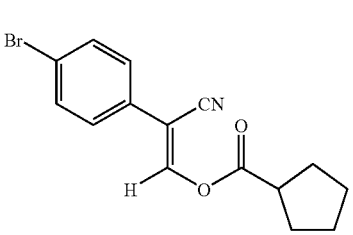
(CD-7)

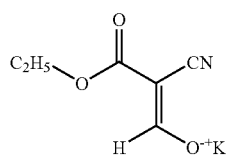
(CD-8)

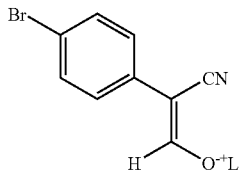
(CD-9)

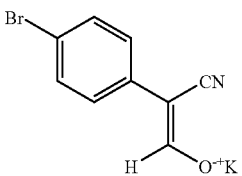
(CD-10)

-continued

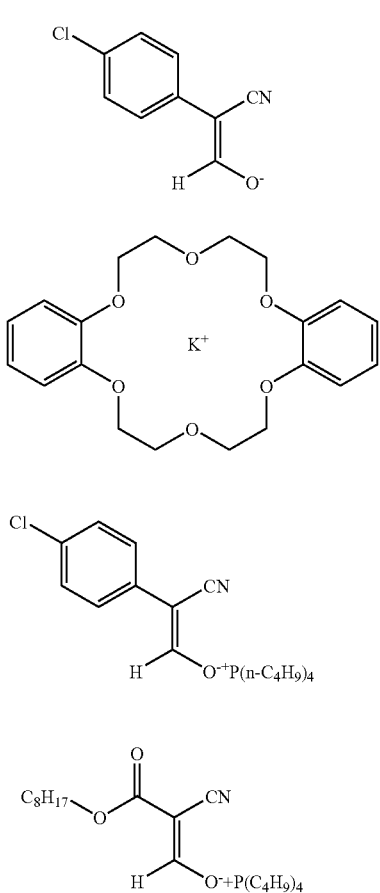

(CD-11)

(CD-12)

(CD-13)

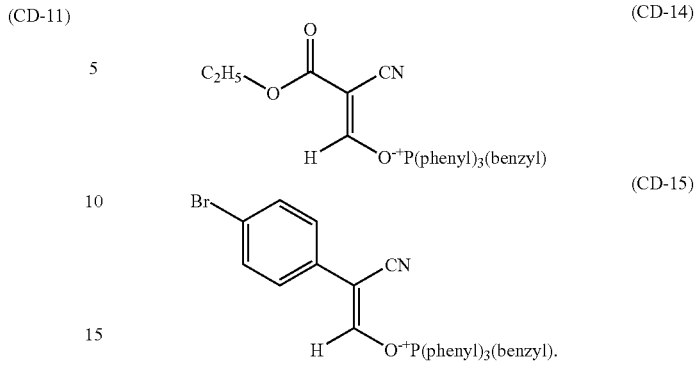

(CD-14)

(CD-15)

17. The photothermographic material of claim 15 further comprising at least one additional reducing agent that is a hindered phenol, a hindered bis-phenol, or a mixture thereof.

18. The photothermographic material of claim 17 further comprising at least one hindered bis-phenol additional reducing agent.

19. A method of forming a visible image comprising:
A) imagewise exposing the photothermographic material of claim 1 to electromagnetic radiation to form a latent image, and
B) simultaneously or sequentially, heating said exposed photothermographic material to develop said latent image into a visible image.

20. The method of claim 19 wherein said imagewise exposing is carried out using laser imaging at from about 600 to about 1200 nm or said development is carried out for at least 3 and up to and including 25 seconds, to provide a visible black-and-white image.

* * * * *